(12) United States Patent
Urakabe

(10) Patent No.: US 9,886,576 B2
(45) Date of Patent: Feb. 6, 2018

(54) SECURITY BOX

(71) Applicant: Hiroshi Sawa, Handa-shi, Aichi (JP)

(72) Inventor: Nobuchika Urakabe, Tokyo (JP)

(73) Assignee: ADMEDEC CO., LTD., Tokyo (JP)

( * ) Notice: Subject to any disclaimer, the term of this patent is extended or adjusted under 35 U.S.C. 154(b) by 8 days.

(21) Appl. No.: 14/356,565

(22) PCT Filed: Nov. 7, 2012

(86) PCT No.: PCT/JP2012/078868
§ 371 (c)(1),
(2) Date: Jun. 23, 2014

(87) PCT Pub. No.: WO2013/069695
PCT Pub. Date: May 16, 2013

(65) Prior Publication Data
US 2014/0351948 A1 Nov. 27, 2014

(30) Foreign Application Priority Data

Nov. 7, 2011 (JP) .................................. 2011-244002
Dec. 1, 2011 (JP) .................................. 2011-264038

(51) Int. Cl.
*G06F 21/53* (2013.01)
*G06F 21/56* (2013.01)
*G06F 21/62* (2013.01)

(52) U.S. Cl.
CPC ............ *G06F 21/53* (2013.01); *G06F 21/566* (2013.01); *G06F 21/567* (2013.01); *G06F 21/6281* (2013.01); *G06F 2221/033* (2013.01)

(58) Field of Classification Search
CPC ...... G06F 21/53; G06F 21/566; G06F 21/567; G06F 21/6281; G06F 21/10; G06F 2221/033; G11B 20/00086
(Continued)

(56) References Cited

U.S. PATENT DOCUMENTS 7,484,247 B2 * 1/2009 Rozman et al. ................ 726/34
7,607,171 B1 10/2009 Marsden et al.
(Continued)

FOREIGN PATENT DOCUMENTS

JP 2004-104739 4/2004
JP 2007-13263 1/2007
(Continued)

OTHER PUBLICATIONS

Office action dated May 8, 2015 in corresponding Australian Application No. 2012336829, 4pp.
International Search Report, corresponding to PCT/JP2012/078868, dated Feb. 5, 2013, 4 pages.
Office action dated Oct. 12, 2015 in corresponding Korean Patent Application No. 10-2014-7015389; 6pp.
(Continued)

*Primary Examiner* — Michael Pyzocha
(74) *Attorney, Agent, or Firm* — Lewis Roca Rothgerber Christie LLP

(57) ABSTRACT

Provided is a security box including: an input means for input of external data; an execution means for executing, in a predetermined area, external data input by the input means; and an isolation control means for isolating the execution area from other areas during execution. The security box can be further equipped with: a display means for displaying the behavior of external data executed by the execution means; a determination means for determining, on the basis of the behavior displayed by the display means, whether the external data is normal data; and a deletion means for deleting data that the determination mean has determined is not normal data and/or all of the data of the execution means.

14 Claims, 11 Drawing Sheets

(58) Field of Classification Search
USPC .......................................................... 726/16
See application file for complete search history.

(56) References Cited

U.S. PATENT DOCUMENTS

| | | | |
|---|---|---|---|
| 8,296,759 B1* | 10/2012 | Hutchins | G06F 9/45558 709/223 |
| 2004/0049596 A1* | 3/2004 | Schuehler | H04L 43/18 709/238 |
| 2006/0021029 A1 | 1/2006 | Brickell et al. | |
| 2006/0291469 A1 | 12/2006 | Omote et al. | |
| 2008/0320594 A1* | 12/2008 | Jiang | G06F 21/566 726/24 |
| 2009/0259869 A1* | 10/2009 | Naffziger | G06F 1/26 713/340 |
| 2011/0004935 A1* | 1/2011 | Moffie | G06F 21/53 726/23 |
| 2011/0047613 A1 | 2/2011 | Walsh | |
| 2012/0079596 A1* | 3/2012 | Thomas et al. | 726/24 |
| 2012/0156802 A1* | 6/2012 | Flagan | H01S 5/0622 436/501 |

FOREIGN PATENT DOCUMENTS

| | | |
|---|---|---|
| JP | 2007-18465 | 1/2007 |
| JP | 2008-500653 | 1/2008 |
| WO | WO 98/08163 | 2/1998 |

OTHER PUBLICATIONS

Juniper Networks; Protecting the Network from Denial of Service Floods; Jun. 1, 2008; 28 pp.
Extended European Search Report dated Jan. 22, 2016 for corresponding European Application No. 12847136.4, 13 pp.
European Search Report dated Sep. 18, 2015 for corresponding European Patent Application No. 12847136.4, 6pp.

* cited by examiner

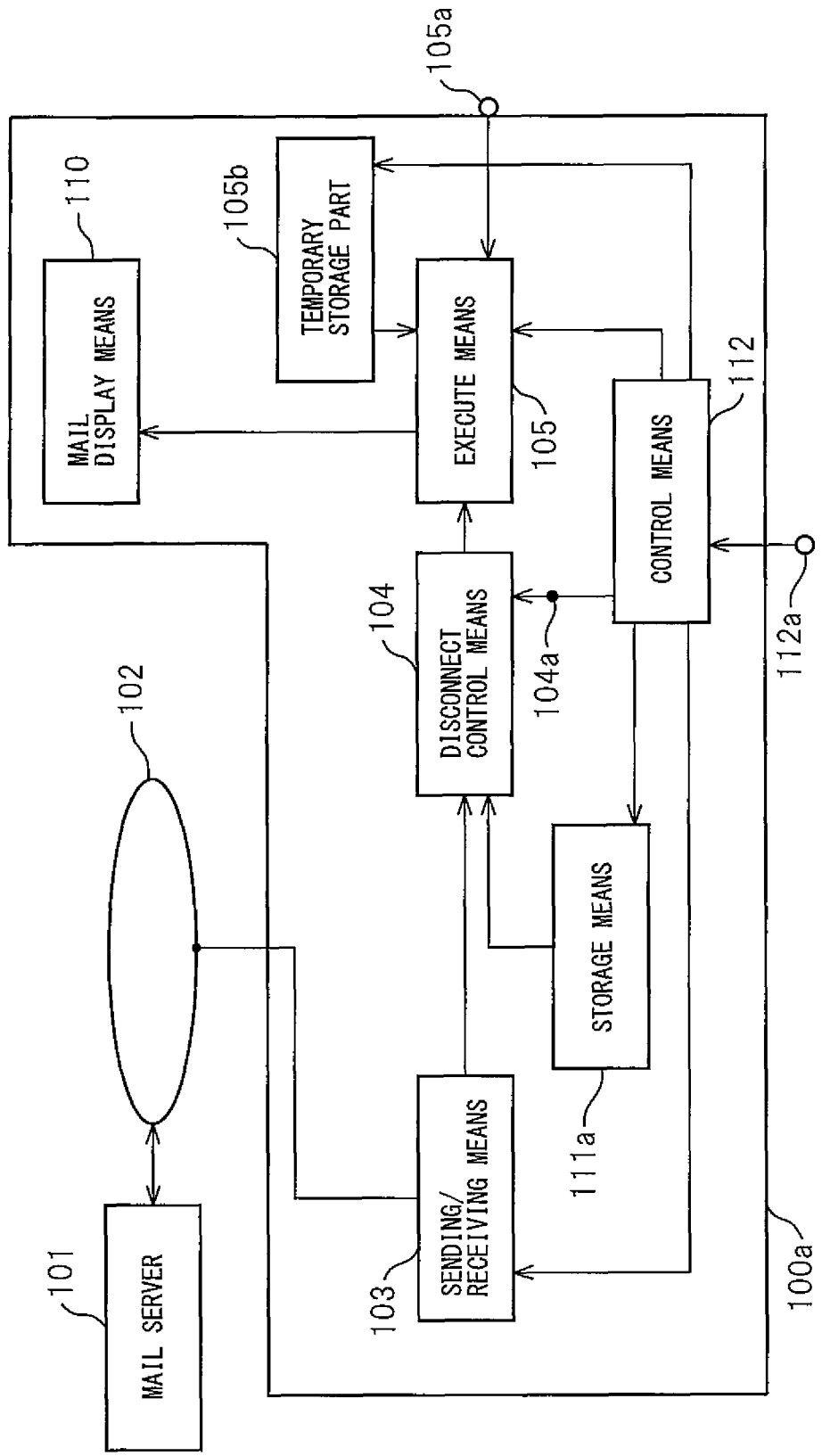

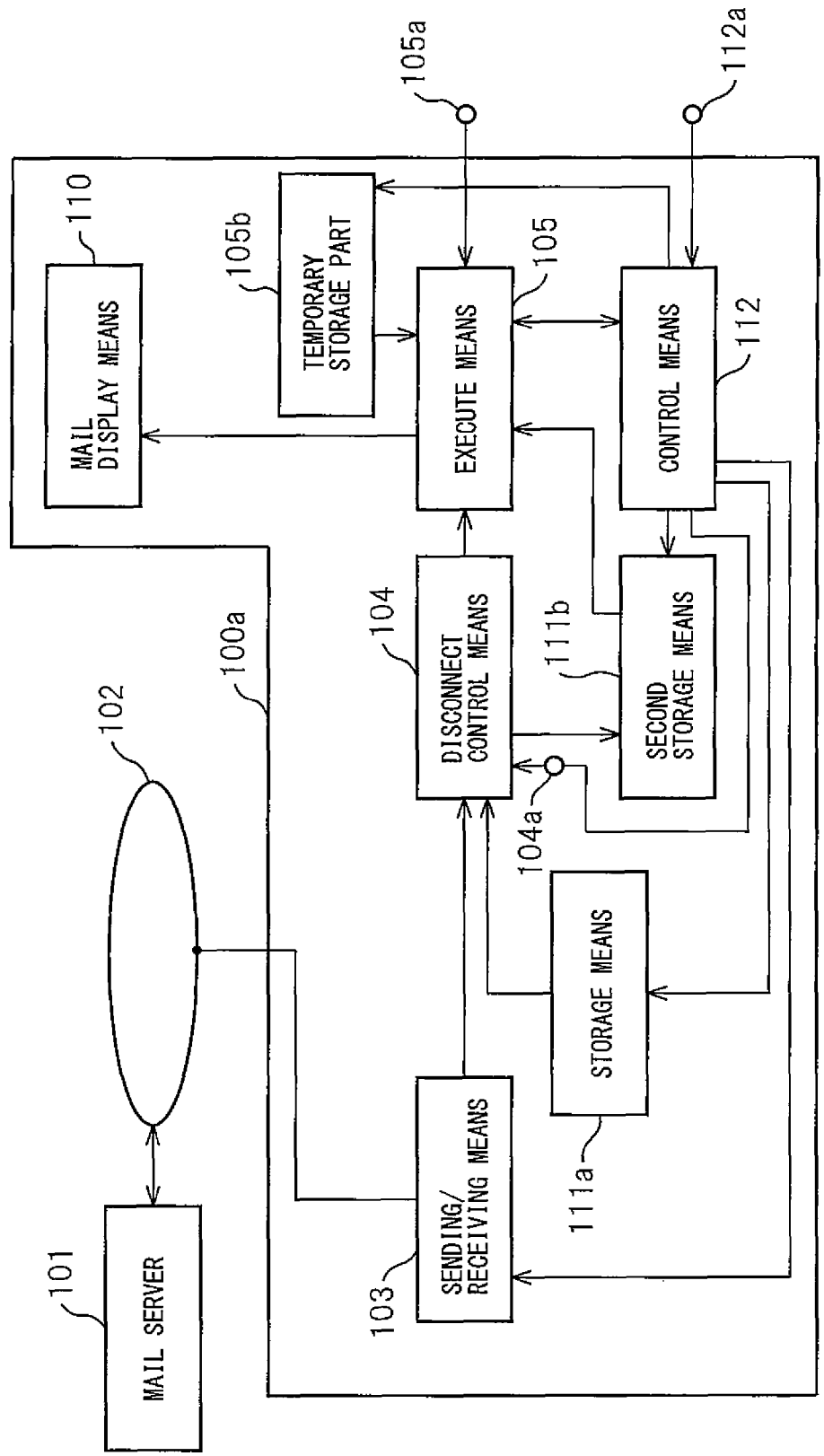

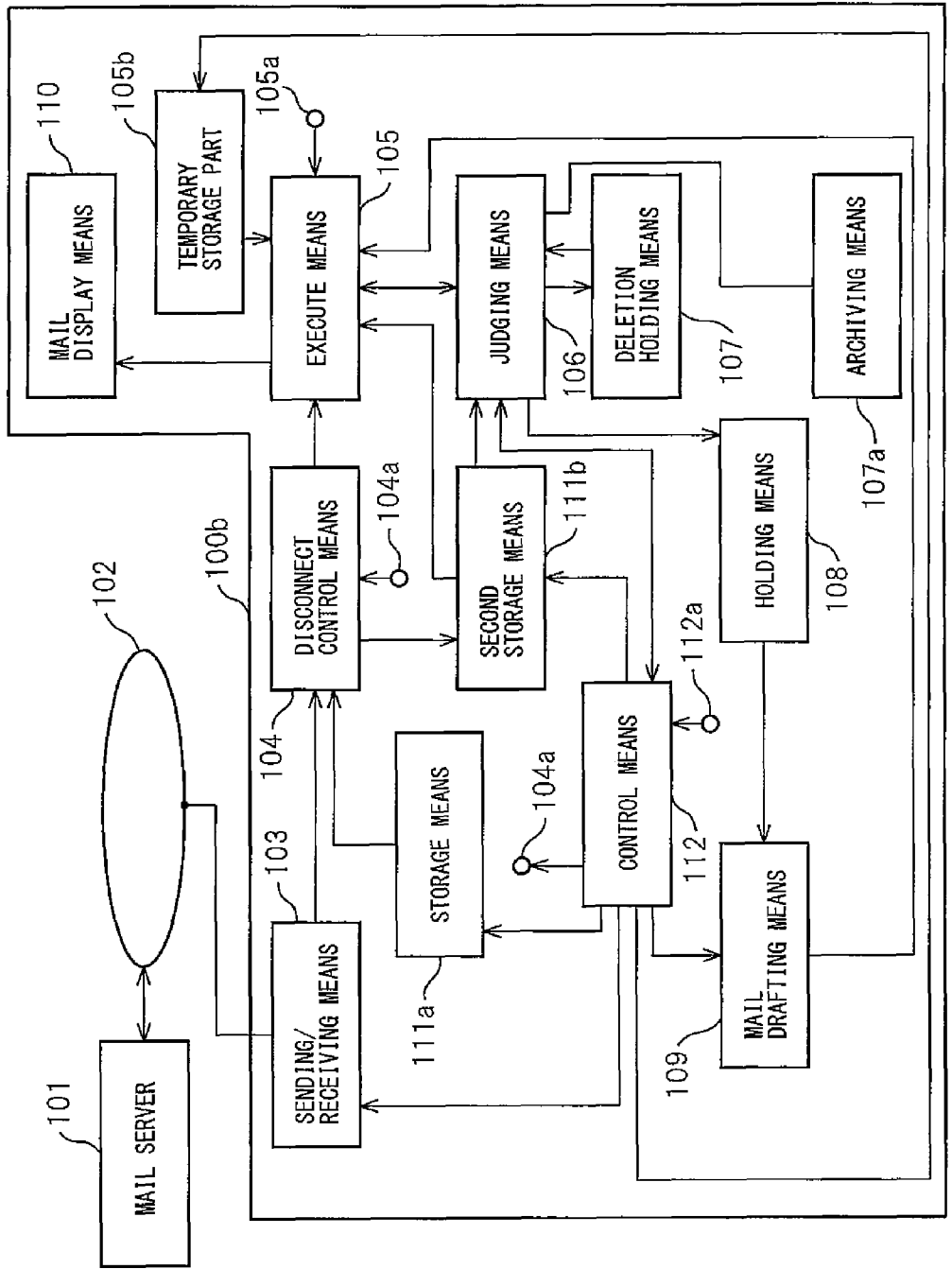

SECURITY BOX

TECHNICAL FIELD

The present invention relates to a "security box" which forms a program execution environment which is not affected by an attack on a web server etc. on the Internet or other network or activity of a virus program due to data etc. which is recorded in a downloaded application, mail-related data, data which is recorded in a portable medium, etc. and therefore ensures security.

BACKGROUND ART

Recently, virus infected e-mails with file names etc. which are disguised as normal have been used to target specific parties for infection in so-called "spear type virus" attacks. These have frequently infected businesses, government offices, foreign legations, etc. By just opening a file which is attached to the e-mail, while on the surface, nothing changes, inside the computer, malicious software is executed and confidential information is leaked to the outside, remote operation from the outside is enabled, Trojan horse type infection is caused, computer functions and operations are halted, and, furthermore, depending on the infected party, electricity, water, or other public services are cut, computer functions are stopped, and various other situations are liable to occur. The technique of sending e-mails containing virus programs using file names etc. which are disguised as normal and are addressed to specific infected parties can be said to be "classic", but it is easy to utilize an unknown virus. To protect against infection by such a virus program, which is difficult to detect by existing antivirus tests, the only effective means is for the e-mail user to be careful. Damage by such e-mails which carry virus programs will probably continue occurring in the future as well.

Further, Trojan horse type computer viruses which open a backdoor for enabling remote operation to take over a computer do not have to specify the target and are high in frequency of appearance, so are hard to detect by virus removal software. Further, once a computer ends up being taken over, that computer can be utilized for the hacker's own purposes, so infection from not only e-mail, but also homepages frequently occurs.

As a technique for removing e-mails which contain general virus programs, for example, there is the technique of comparing an e-mail which is received at a POP server against a pattern file by virus removal software and, when a virus is discovered, performing an operation to remove it before or after the e-mail reaches the client. In this method, the pattern file contains information on past viruses and patterns of behavior (definition files). The method compares the pattern file against a suspicious file and judges there is a virus when the contents match or are similar, so deals with general viruses characterized by the same data names etc. When containing a file name which is disguised as normal so as to infect a specific party or a pattern which is unknown to the pattern file, detection is almost impossible. Further, at the present, there are reports of unknown viruses appearing every several seconds. This makes protection by more generalized antivirus software difficult.

Japanese Unexamined Patent Publication (Kokai) No. 2005-157598 describes the technique of separating an attached file and text, then converting the configuration data of the attached file to data of a safe format, forming a file which is configured by this converted data, and using the text of the e-mail which is previously sent to the user and a key for opening the attached file to open a safe attached file. Further, Japanese Unexamined Patent Publication (Kokai) No. 2004-38273 describes a system which constructs a virtual host, executes the file, and prevents virus infection while running a virus test.

To use these techniques to discern an e-mail which appears normal but contains a virus, it is necessary to check all attached files, time and trouble are taken for ensuring security, and otherwise the load on the side managing the mail server becomes greater. No simple solution has yet been achieved. In the final analysis, the classic attack using an e-mail which is disguised as normal can presently only be prevented by checking the e-mail without opening the file and then deleting it or by moving it to another recording medium etc. and using virus check software to check for a virus.

When virus mail proliferates and infects a large number of poorly maintained servers, attack packets etc. are sent to specific web servers in a limited time and destabilize operations of the computer systems thereby inflict commercial damage.

Here, a DOS attack or DDOS attack which sends a flood of attack packets to specific WEB servers can be prevented by filtering functions which is provided at firewalls. As the filtering functions which can be used, there are static filtering, dynamic filtering, stateful inspection, tests of applications and data, etc.

However, when using the above filtering functions, the destination IP address, origin IP address, protocol no., destination port no., origin port no., etc. have to be registered in advance. Further, servers which do not match this information cannot be protected by the filtering effect. The related operations (for example, Internet→LAN→origin port no. 80 and/or origin IP address . . . , destination port no . . . , destination IP address . . . ) have had to be dynamically registered in advance. However, when allowing passage of packets which comply with the related operations in this way, again, registration in advance is necessary Furthermore, such countermeasures are not necessarily effective against disguised packets.

CITATIONS LIST

Patent Literature

PLT 1. Japanese Unexamined Patent Publication (Kokai) No. 2004-38273
PLT 2. Japanese Unexamined Patent Publication (Kokai) No. 2005-157598
PLT 3. Japanese Unexamined Patent Publication (Kokai) No. 2006-254269
PLT 4. Japanese Unexamined Patent Publication (Kokai) No. 2011-221993

SUMMARY OF INVENTION

Technical Problem

To prevent infection by received mail which contains virus programs which target specific infected parties and are disguised as normal and data files which are attached to that received mail, received mail which contains unknown virus programs and data files which are attached to the received mail, etc., the only solution is for the user side to exercise caution. There is still no reliable defense.

In this way, the proliferation of virus mail produces computers serving as launching platforms for DDOS attacks and DOS attacks. Disguised packets which cannot be removed by existing filtering are still attacking web servers, cloud computing systems, etc. There is still no sufficient way for dealing with such malicious attacks.

Solution to Problem

Considering the above, the present invention realizes a system which uses a combination of a sending/receiving means for sending/receiving e-mail-related data, a disconnect means for disconnecting an execution area and network connect part or other connect area when executing e-mail-related data which is received by the sending/receiving means, and a control means for controlling the disconnect and connect operations of the disconnect means to thereby realize a system whereby even if carelessly opening mail with e-mail-related data which is executed by the execute area and for example includes a virus program or data which is infected by these virus programs and which is disguised as normal, it becomes possible to open and view e-mail or reply or forward it or perform other operations without affecting the outside or the system and further without worrying about virus infection. In other words, this system can be said to be one which is provided with a plurality of means (units) which are required for forming such a program execution environment, that is, is a "security box".

Note that, in the case of a software-based execute means using a computer program, sometimes a program in the execute area after execution of the received mail is infected by a virus, so after an e-mail including a virus program (below, referred to as "virus mail") is confirmed, after received mail-related data is opened and confirmed, or at another timing, the control means may output a reset signal which erases the recorded data of the recording means etc. or may overwrite the data to form a state corresponding to erasure.

Further, when making the execute area a ROM or other nonwritable memory and storing a program in it and using a recording device which records part of the parameters etc., sometimes a resetting means becomes unnecessary. In the present invention, the e-mail is not limited to general mail. It may also be information which another party sends for attack purposes. Cases of information which is sent by FACEBOOK® etc. from another party being received and displayed etc. are also included. Information by which another party attaches and sends virus information to obtain information or destroy a system or otherwise attack a user is included in the "e-mail" of the present invention. HTML mail which connects to a server which contains virus information and downloads, executes, and displays a virus program if clicking on a specific area on the text of the mail is also included in the "e-mail" which is referred to in the present invention.

In the present invention, a "virus program" is a program which is written so as to intentionally inflict some sort of damage on the program or database of a third party as shown in "Computer Virus Countermeasure Criteria" (METI notification) and has at least one of the following functions.
(1) Self-Infection Function:
Function of using own function to replicate oneself in other program or utilizing system function to replicate oneself in other system and thereby infect other system.

(2) Latent Function:
Function of storing specific timing, certain time period, number of processing operations, and other conditions for activating virus to prevent symptoms from appearing until activation.
(3) Activation Function:
Function of destroying program, data, and other files or performing operation not intended by designer etc.

Note that, in addition, a worm type program which for example has a self-proliferating function and acts independently, a Trojan horse type program which does not have a self-proliferating function, but enables a third party to remotely operate the computer remotely or obtain passwords or other personal information, etc. are shown as computer viruses. Further, virus programs include, in addition to the above-mentioned malicious programs, that is, programs where the intent of the designer is to acquire personal information, alter data, etc. and were created for malicious purposes from the start, programs with descriptions of content causing users to carelessly open them.

In the present invention, "network" includes the Internet, an Intranet, Extranet, mobile phones, connection by wired or wireless connection using light, radio waves, or other electromagnetic waves etc. as transmission media etc.

"Terminal" shows a notebook, netbook, tablet type PC, desktop PC, mobile phone, smartphone, or other independent device of a stand alone type first of all and also a virtual area which is formed in software which operates on a single personal computer in a virtual computer mode.

Further, sometimes rather than use a two-dimensional display means, a configuration of an extent displaying information by switches and light of LEDs is also possible.

"Mail-related data" indicates mail text, attached files, etc. and includes at least data of a format which can be infected by a virus. Further, "mail" sometimes means e-mail, but need only be data which has an attack-like intent and is in a state where it may be started up and executed by a user or related party.

Note that, if the attached file is, for example, a PDF file, Adobe Reader® is necessary etc. Depending on the format of the data, the program for opening it differs, but when a small size viewer program which enables only viewing is enough and, furthermore, the only aim is detection of a virus program etc., sometimes a program for opening it is not necessary.

In the present invention, provision of at least a generally used configuration and operating system for operating a computer is preferable, but when only deleting a virus program, sometimes a program which is designed for viewing and display becomes unnecessary.

In the present invention, the "disconnect from other areas" sometimes means at least, when mail-related data is displayed on a monitor as to be executed or to execute, the electrical connection between areas other than for this display operation being temporarily broken so as to break the connection with the network or the connection with a startup related program, but also includes disconnecting data communication with software which is affected when at least mail-related data is executed such as other driver software, system software, network connect related software, or other software which a virus tries to target or devices in which these software are recorded, connect devices, and input/output terminals, and electrical disconnect due to differences in operating systems, differences in format, differences in signal patterns, etc.

"Temporarily" indicates at least the time period in which the content of e-mail is displayed by a display means and the virus program is in an execute state etc.

The disconnect means includes, for example, a device which has two or more input terminals and a single output terminal such as a NOR circuit, NAND circuit, or other logic circuit, a logic IC, relay switch, transistor, FET, or other switching device used in a circuit or disconnect of data transmission due to differences in format due to formation of virtual execution environments by different types or versions of software on a single operating system, de facto disconnect due to utilization of different operating systems or a plurality of devices which record and execute programs which use different formats, etc., but is not particularly limited.

In the present invention, the control means performs input/output control for disconnect and connect of the disconnect means, startup control for the execute means, storage and erasure control of the storage means, etc. and is preferably configured by a logic IC, ASIC, or other hardware, but may also be a computer specification comprised of a ROM or other storage device which is set to a nonwritable state and in which a program is stored.

Note that, the control means is preferably provided with the function of enabling mail to start to be read or finish being read and enabling mail to be deleted by manual input by the user (input by man-machine interface by buttons, keyboard, mouse, touch operation, etc.) Virus mail can be determined to possibly have a virus attached by judgment of the content by the user even if disguised in the title or sender to trick the actually targeted user, so even without a virus test function, so long as disconnected by the disconnect means, sometimes functions of opening, viewing, and deleting e-mail are enough.

In the present invention, the "execute means", for example, shows a computer configuration which includes a CPU, ROM, RAM, or other memory device. It is not particularly limited so long as at least mail-related data is executed and an output means is provided by which a user can confirm the mail content by sight, sound, etc.

Further, in the present invention, the execute means sometimes forms an environment in which different versions of the same operating system can be executed on a single operating system program or forms a state in which different specifications of operating systems are executed to disconnect the data transmission or sometimes uses a microprocessor chip which is provided with a plurality of CPUs, has one CPU perform the sending/receiving operations of mail, and has another CPU execute and display the mail-related data, but if necessary may also, in accordance with need, form a disconnect state due to the formats of data other than the mail-related data being different.

When using a different version of an operating system or a different specification of an operating system on a single operating system program, sometimes a storage means which is comprised of a device which can temporarily store mail-related data such as a RAM, USB memory, SD card, hard disk, FD, CD-R, or other medium and which enables read and write operations between two operating system is provided to move the mail-related data.

In the same way in the case of a microprocessor chip which uses a plurality of CPUs, sometimes the above-mentioned storage means may be used.

In the case of an execute means of a type which reads and executes a program, when a virus program is executed and the program recording part is a writable area, after the operation for opening one piece of mail is finished, the control means is used to reset the program recording part. It is preferable to record a program which is stored in another storage means in the program recording part or switch them so as to prevent infection of the execute means itself. The program recording part is preferably reset by an operation equivalent to a full erasure of data. Furthermore, it is sometimes also possible to use an electrical operation for erasing the stored content of the device.

In the present invention, the judging means which is used as the means for detecting a virus program is, for example, preferably configured to connect a counter, flipflop, integration circuit, etc. to a portion with almost no output when displaying e-mail text or displaying or executing an attached file at a port which connects with the network in the I/O ports of the execute means and to output a digital signal indicating that a virus is contained when the output value exceeds a certain value.

In the present invention, "behavior" is information which corresponds to movement of data in the area in which the execute means executes data and which can be recognized at the outside. For example, it is a phenomenon which occurs due to data which is input/output to an IC chip on a board and which can be visually observed. For example, one or a combination of a plurality of an optical signal, ultrasonic wave signal, sonic wave signal, magnetic signal, electromagnetic signal, and thermal signal may be mentioned.

This observable information can naturally be detected by a sensor and be input to a system which can process the information by a computer etc. Due to this input, various configurations for driving devices can be employed. That is, the object of a virus program is to be executed and to infect a system, that is, to store, rewrite, and erase data etc. and to output data to an outside destination. The timing of the infection is most often the point of time of execution when opening and confirming the mail and attached file.

Regarding this timing, in a mailer program, usually, there is a timing at which data cannot be written. Therefore, if there is behavior of data such as writing of data in the storage means or sending of data to a LAN or other outside destination in a state where data cannot be written and a state in which data is never sent to the outside, it is possible to detect behavior of a virus program.

Further, the time of behavior of data, for example, the amount of movement of data when writing it in the memory, corresponds to the size of the data. A virus program is often smaller in amount of data and instantaneous in behavior compared with ordinary text data. Therefore, the behavior time (for example, time of operation of LED which turns on when writing data in the memory) may also be used to confirm the presence of a virus program. Further, when data of the RAM etc. is temporarily written in and executed, light emission by an LED which is connected to, for example, the WE (write enable) terminal which is connected to the memory in which the system data is stored may be used to show that data has been written in the memory for system storage. Usually, when displaying data of mail, if writing of data is detected at a timing in which data is never written, the fact that this data may well be the result of execution of a virus program will be understood. Further, at that time, in a multitask type operating system, it is sometimes preferable that other tasks, that is, applications, not operate.

Further, when the path of movement of data can be confirmed and data of the database is read out and sent to the outside through the LAN, it is also possible to detect for example the flashing of an LED which is connected to the storage memory from which the data of the database is read out and which shows readout behavior, next flashing of an LED which shows the sending state of the LAN, or other time-series behavior. The amounts of flashing of the LEDs correspond to the magnitude of the data, so it is possible to confirm that there is a large possibility that a virus program has been executed and that the target data has been read out from the database and sent through the LAN to the outside. When occurring at the timing when mail and mail attached data are opened, the possibility of execution due to a virus program becomes further larger.

It is also possible to detect the behavior of data in the process of such a series of mail opening operations so as to detect the presence of a virus program and, as a result of being detected, display the presence to the user for confirmation or perform an operation to erase the operating system and other applications wholesale.

As a preferred example of configuring this state, for example, the means of reset manually or automatically (erasing means) to startup in the state where the connection with the flash memory or hard disk is broken and the operating system and application are written in the RAM, that is, the state of startup by so-called RAM drive, so as to erase the inside data is preferable. In this case, by using a small size operating system such as WINDOWS PE®, WINDOWS CE®, ANDROID®, KNOPPIX®, etc., the time at the time of restart is shortened. Detection of such behavior sometimes also forms part of the judging means.

As an example of the terminal which is formed by the present invention, there is a stand alone terminal. In the state disconnected from the network, sometimes it is not particularly necessary to perform a disconnect operation or set a configuration for that purpose. That is, in the state of a gate array or when using a program which is recorded in a ROM for execution and using a small size memory device, there is no need for a disconnect operation. Execution as is also possible in some cases. The "disconnect" in this case includes the case, for example, where the connection with the network is detachable and a network terminal is pulled out to separate it from the base unit.

That is, when just viewing e-mail text, an attached file, or other mail-related data, a terminal of this state is also possible.

Furthermore, for example, a specification may be illustrated in which when using a terminal which views and displays mail and checks for virus infection and there is no infection, a normally used personal computer may again be used to receive mail from the mail server and open the mail-related data.

When performing a series of operations such as reply, forwarding, archiving, etc., a judging means may be provided for performing a virus test.

When disconnecting and connecting a program in the system area, for example, it is possible to store a system-related program and mail execution application program in different storage means and possible to read them out and execute them at respectively different timings.

Further, when recording a system area or an area which stores an application, including a mail execute area, in a ROM (read only memory), sometimes a disconnect means becomes unnecessary for this part.

Application to Download Application

The present invention is configured to be able to prevent data from being divulged to the outside and the computer from crashing and thereby being destroyed etc. even if carelessly opening an application program which downloads an attached file or mail text from a web server or mail server or a virus program which is already contained in data and a USB memory or other media and to sometimes identify and delete the virus program.

This, for example, can be realized by providing a device which can control one or both of disconnection and connection of data transmission by an outside signal at an input/output part of the memory or a connect part with the network.

Advantageous Effects of Invention

The present invention creates a terminal which mainly sends and receives mail and which, when mail-related data is executed, breaks a connection with a network, system program, or other part which a virus targets for infection so as to enable display of data without problem even with virus infection, therefore enables secure transfer of mail without taking up the issue of virus infection. It realizes a terminal dedicated to sending/receiving mail, that is, a box-like terminal which realizes security of mail.

Further, when execution of a virus program would cause a signal to be output to an I/O port or other input/output part other than one executing mail-related data, when data is stored once in a memory and the destination IP address is searched for and detected, when detecting information which is derived from a packet signal, when a certain threshold value which counts output of a signal trying to send data is exceeded, or when despite there being no need for a program to send information to another party, transmission data is formed and output, sometimes this fact is displayed on a liquid crystal monitor or LED to enable detection of infection by an unknown virus.

In this case, sometimes there is no need for a template file for viruses, updating the file also becomes unnecessary, and the configuration is streamlined.

BRIEF DESCRIPTION OF DRAWINGS

FIG. 1A is a block diagram which shows a first embodiment of the present invention.

FIG. 1B is a block diagram which shows a second embodiment of the present invention.

FIG. 2 is a block diagram which shows a third embodiment of the present invention.

DESCRIPTION OF EMBODIMENTS

Figure 3:
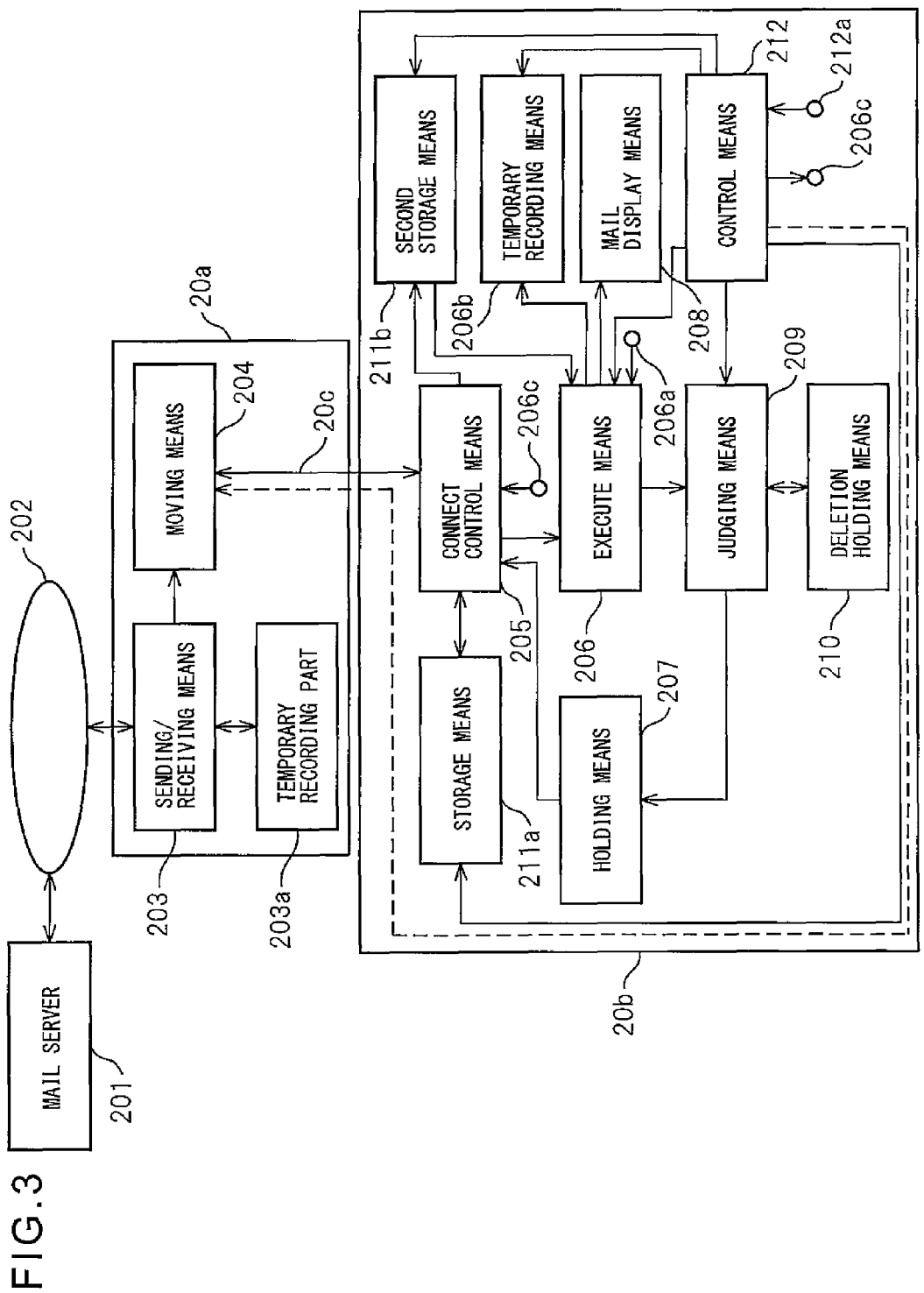
FIG. 3 is a block diagram which shows a fourth embodiment of the present invention.

After this, preferred embodiments of the present invention will be explained while referring to the attached drawings. Note that, the present invention is not limited by the specific embodiments which are described below.

The present invention may provide a notebook type, tablet type, mobile type, or other terminal (stand alone type terminal) with a mail sending/receiving means and display means and, when executing the received mail by an execute means, for example, provide a network connect means and a disconnect means for disconnecting data transmission between a startup system program and the execute means or provides a computer side with a mail sending/receiving means which can connect with a normally used computer and provides a connect terminal side with a disconnect means and execute means. It may also provide a means by which the received mail is not deleted on the mail server when the terminal side receives it, displays the mail by the execute means which is provided with the disconnect means which is shown in the present invention, then confirms virus infection etc. and enables reception again when there is no infection.

It is also possible to use a configuration which resets and erases the stored data of an area which was disconnected after a virus infected mail was confirmed and copies a program in the reset storage device before again reading the received mail.

The present invention provides means for disconnecting and connecting data transmission at an input part of a hard disk or other continuous storage means, an input/output part of data of a connect part with a LAN, wireless LAN, or other network, or an input/output part of data with a USB or other means for storing data by external connection to thereby restrict input/output of data with the outside and, further, uses a storage means which temporarily stores the stored part of the data which would affect a program when executing it by a processor to thereby enable data processing without worrying about virus infection. Further, it can also defend against outside attacks by disconnecting data transmission, then diverting the data to a circuit which performs data processing for processing.

[First Embodiment]

Next, referring to FIG. 1A, a first embodiment of the present invention will be explained.

In FIG. 1A, reference numeral 100*a* indicates a base unit. The base unit 100*a* shown is a stand alone type unit which is, for example, provided with a display, keyboard, and mouse, a unit which is provided with a display, virtual keyboard, touchpad, etc. More specifically, it is preferably configured by a PDA type, desktop type, notebook type, tablet type, or netbook type computer specification, smartphone, mobile phone, etc., but the present invention is not limited to these. The base unit 100*a* may be of any type so long as a user can receive and display mail.

Reference numeral 101 shows a mail server. As the mail server 101, a general POP server, SMTP server, etc. may be illustrated. It can form a state in which mail which is sent/received is temporarily stored.

Reference numeral 102 shows a network. The network 102, for example, is formed by the Internet, Extranet, an Intranet, mobile phone lines, or other wired or wireless connections or both.

Reference numeral 103 shows a sending/receiving means. The sending/receiving means 103 is a part which is connected with the network 102 by a wired or wireless connection and sends or receives mail and mail attached files and may be set to a state enabling communication with a mail server.

The network 102 and the sending/receiving means 103 may, for example, be connected through a provider by a modem, router, wireless router, antenna, or other relay terminal. It need only be a general connect means.

Reference numeral 104 shows a disconnect control means. The disconnect control means 104 is a part which disconnects and connects the sending/receiving of mail. For example, a configuration which combines a NAND, NOR, or other logic circuit which is provided with a control input terminal and a relay combination or a software disconnect configuration, for example, a configuration which sends and receives data in a restricted manner between different operating systems or between different programs, etc. may be mentioned. The disconnect control means 104 disconnects and connects at least data. It may connect to allow movement in only one direction or connect to enable movement in both directions. It is not particularly limited so long as being configured for its purpose. Further, the disconnect control means 104 may, for example, use an "1" or "0" signal of a digital signal which is input through a control input part 104*a* to, for example, perform a switching operation between a disconnect state and a connect state between the sending/receiving means 103 and an execute means 105.

The execute means 105 is illustrated as a computer specification which is provided with a CPU and memory and an input part 105*a* which receives input from a storage part and user through a keyboard, virtual keyboard, touchpad, mouse, or other interface or a custom or semicustom IC specification which combines a gate array cell base, embedded array standard cell, and structured ASIC or other ASIC. The execute means 105 is at least provided with the function of executing a mail program called a "mailer", WORD®, Adobe Reader®, or other program for opening attached files and thereby being able to open attached files. In some cases, WINDOWS®, LINUX®, Mac OS®, or another general operating system may be introduced, and a mailer program which operates on that general operating system may be installed and executed.

When the execute means 105 views mail, sometimes the keyboard becomes unnecessary. In addition, it sometimes may be configured by a touchpad, mouse, jog dial, switches, or virtual switches.

Further, the execute means 105 sometimes may connect with a control input part 104*a* of the disconnect control means 104 and output instructions for controlling the connection and disconnection of data of the disconnect control means 104.

The storage part which is directly connected to the execute part sometimes is sometimes preferably one which cannot be written in and which stores an attached file display program, operating system, mailer software, etc.

Further, when formed by stored program-like software, the execute means 105 is sometimes preferably has the driver software which is used for purposes other than operations aimed at opening attached files etc. removed in advance.

The execute means 105 is preferably provided with a temporary storage part 105*b* which temporarily stores the mail which is received at the sending/receiving means 103, but does not particularly have to be provided with this. If a computer specification, sometimes it is also possible to use part of the storage area corresponding to the temporary storage part.

Note that, sometimes the execute means 105, for example, may be provided with a detachable storage medium which stores software (program) for reading a PDF file (Adobe), a WORD® file, or an EXCEL® file so as to enable this software (program) to be executed when upgraded in version. The input part for input of these upgraded versions of programs to the base unit 100*a* may be directly connected with the execute means 105 or may be set through the sending/receiving means 103 and disconnect control means 104. In this case, the execute means 105 may sometimes be provided with means for confirming the security of the data. Further, when file viewing is the main object, sometimes a program of the level of a viewer is enough. The frequency of updating the versions can sometimes be kept down.

Reference numeral 111a shows a storage means. The storage means 111a is a ROM or other such storage device which is set to allow only read operations or a RAM or other such readable/writable recording part. As the storage means 111a, for example, a flash type storage device, ROM, CD-ROM, CD-R, DVD, MO, hard disk, SD card, USB memory, or other media may be illustrated. The storage means 111a may be suitably selected according to the size of the base unit 100a, the necessary storage capacity, etc.

A holding means (not shown), the temporary storage part 105b, and a deletion holding means (not shown) may be formed by the storage means 111a, but considering security, they may also be formed by separate storage devices or media. Further, the storage means 111a is connected with the disconnect control means 104. This is so as to prevent a virus from invading the storage means 111a from the execute means 105. Note that, when a mail-related program is stored in the ROM, the storage means 111a sometimes may be directly connected to the execute means 105.

The storage means 111a sometimes records a mail opening program, attached file opening program, and user mail address, password, other account information. The user information sometimes may be recorded in the control means 112. When the execute means 105 is an execute circuit using a gate array or other custom or semicustom hardware, the storage means 111a sometimes may have just a mail address, password, account, or other data required for sending/receiving data by e-mail recorded in it.

When the mail opening operation ends, sometimes the data which is temporarily stored for connection with the execute means 105 is preferably deleted.

When finishing being deleted, to change the disconnect control means 104 from the disconnect state to the connect state, the control means 112 outputs a connect instruction to the control input part 104a. The control means 112 is configured by gate array or other ASIC or logic ICs combined to form a digital signal processing circuit or other hardware configuration or by a computer which operates by a program which is stored in a ROM or a storage device which enables only read operations and is provided with a control input part 112a which uses user button operation, keyboard operation, touch operation by a touchpad, etc.

The control means 112 connects with the control input part 104a of the disconnect control means 104. Further, the control means 112 is a means which connects with the execute means 105, the temporary storage part 105b and storage means 111a, and the sending/receiving means 103 and performs control to reset the storage, copy a recorded program of the storage means 111a in the temporary storage part 105b, start and stop the sending/receiving operations of the sending/receiving means 103, etc. The operation of the control means 112 is sometimes performed by input from the control input part 112a or automatically.

Next, the operation of the embodiment which is shown in FIG. 1A will be explained. Note that, FIG. 1A shows an embodiment where the base unit 100a is made the above-mentioned stand alone terminal.

The sending/receiving means 103 of the base unit 100a is connected with the network 102 by wired or wireless connection.

Based on an input operation of the user from the control input part 112a or based on a preset setting of automatic connection, the control means 112 starts up the sending/receiving means 103. The sending/receiving means 103 requests receipt of the received mail which is temporarily stored in the for example POP server of the mail server 101. The received mail is input through the network 102 to the sending/receiving means 103 and is output to the disconnect control means 104. The control means 112 outputs a signal for connection to the control input part 104a, while the disconnect control means 104 forms a connect state and prepares an environment in which the received mail can be supplied to the execute means 105.

The execute means 105 receives this received mail by, for example, an input signal from the input part 105a. Note that, when the disconnect control means 104 is set to the disconnect state, sometimes it is also possible to provide a buffer like memory which temporarily records data and store the data up to when the disconnect control means 104 forms the connect state.

The control means 112 has the execute means 105 which receive as input the received mail and store it in the temporary storage part 105b or detects the state of the sending/receiving means 103 receiving the received mail and outputs an instruction signal which breaks the connection to the control input part 104a of the disconnect control means 104.

The disconnect control means 104 disconnects the data transmission between the execute means 105 and the sending/receiving means 103 and, in some cases, disconnects the data transmission between the storage means 111a and the execute means 105.

The received mail which is temporarily stored in the temporary storage part 105b is opened and executed both for the mail text and attached files at the execute means 105 based on input from the input part 105a or automatically when automatic action is set and is displayed at the mail display means 110.

After being displayed at the mail display means 110, the received mail of the temporary storage part 105b is suitably erased by a signal from the control means 112. This erasure may be performed by input of the user from the control input part 112a or may be performed automatically when automatic erasure is set. Note that, this erasure is preferably full erasure as with the function of a general mailer.

Until being erased, the control means 112 continues to output an instruction signal to break the connection to the control input part 104a of the disconnect control means 104.

When just referring to the received mail, even if infected by a virus, since the disconnect control means 104 is used to disconnect transmission of data to the outside and storage means 111a, the virus will not infect the outside. Therefore, the user can read the mail without being affected by the virus.

Sometimes the control means 112 transfers a stored program of the storage means 111a through the disconnect control means 104 set to the connect state to the execute means 105 and copies it there in an overwrite manner by a signal from the control input part 112a or automatically after the mail is opened and the mail display means 110 operates to display the mail. This is because due to this overwriting, even if virus data is inserted into a program which is temporarily stored in the execute means 105, the result is a de facto reset state.

[Second Embodiment]

Next, referring to FIG. 1B, a second embodiment of the present invention will be explained. FIG. 1B shows an embodiment which adds a configuration of resetting the readable/writable recording part of the execute means when it is infected by a virus program. Note that, in the explanation given with reference to FIG. 1B, explanation of the configuration and operation of the parts which are configured in the same way as FIG. 1A will be omitted.

In FIG. 1B, reference numeral 112 shows a control means. The control means 112 is provided with the functions and operations which are shown in FIG. 1A plus, for example, means for fully erasing data etc. which is recorded in a second storage means 111b or is recorded in another recording buffer which records it temporarily for executing a mailer which is recorded in the storage means 111a (program for displaying and drafting e-mail) at the execute means 105. It may utilize either software-like means and hardware-like means, but the control means 112 for example is preferably set as hardware such as an output circuit for outputting a digital reset signal.

Further, after reset, the control means 112 is provided with the function of moving and copying a stored program of the storage means 111a to the second storage means 111b for enabling the execute means 105 to execute and display the received mail-related data. As the method for forming this configuration, for example, a hardware circuit which uses a logic IC which copies data between storage means may be provided.

Further, the control means 112 can employ means for holding a program for copying data from the storage means 111a to the second storage means 111b as a ROM and copying the content of this ROM in the second storage means 111b.

Further, the control means 112 connects with the control input part 104a of the disconnect control means 104 and, after the stored content of the second storage means 111b is reset, outputs a signal to the control input part 104a to the effect of connecting the storage means 111a and the second storage means 111b.

The second storage means 111b is preferably formed by a RAM (random access memory) or other writable chip. The second storage means 111b is sometimes a temporary recording area which temporarily records a mailer, parameters which are prepared by the mailer, etc. Note that, this sometimes becomes unnecessary when the program is fixed and the virus program does not alter, delete, or parasitically add content and no RAM or other storage device which enables a write operation is provided.

Next, the operation of the embodiment which is shown in FIG. 1B will be explained. Note that, the embodiment which is shown in FIG. 1B performs an operation similar to FIG. 1A except for the case where a virus infection is confirmed, so similar explanations will be omitted.

When, from the content of the text of the e-mail, there is a possibility of a virus infection being confirmed in the e-mail or when e-mail viewing ends without virus infection being a problem, the control means 112 which is shown in FIG. 1B outputs a signal for resetting the recording of the recording means and storage buffer resulting from a program which operated to open received mail of the execute means 105 by an input signal by a user from the control input part 112a or by an automatic input signal.

If the recording in the execute means is reset, sometimes it is necessary to again read the program which is stored in the storage means 111a. In this case, the control signal which the control means 112 outputs may be input through the control input part 104a to the disconnect control means 104, the storage means 111a and the second storage means 111b may be connected, the program which is stored in the storage means 111a may be stored in the second storage means 111b, and the execute means 105 may again execute the mailer program. Such an initialization program is preferably recorded in a recording part which is built in the control means 112 and in which a write operation is not possible.

Note that, when the execute means 105 receives a received mail and it is an e-mail which is not liable to have been infected by a virus, if necessary a reply and forwarding means may be provided at the execute means 105. In this case, the input part 105a may have a man-machine interface connected to it for drafting text.

[Third Embodiment]

Next, referring to FIG. 2, a third embodiment of the present invention will be explained.

The embodiment which is shown in FIG. 2 adds means for detecting a virus in the received mail etc. and reply, forwarding, and mail drafting means for mail when there is no virus infection. Note that, parts of the configuration which are shown in FIG. 2 which are similar to those of FIG. 1A and FIG. 1B will be assigned the same reference numerals and explanations here will be omitted. Note that, below, FIG. 1A and FIG. 1B will be referred to overall as "FIG. 1".

Reference numeral 100b shows a base unit. The base unit 100b is shown as a stand alone type. As the base unit 100b, for example, one which is provided with a display, keyboard, and mouse and one which is provided with a display, virtual keyboard, touchpad, etc. may be illustrated. The base unit 100b is more specifically preferably configured as a PDA type, desktop type, notebook type, tablet type, or netbook type computer specification, a smartphone, mobile phone, etc., but the present invention is not limited to these. So long as a form which enables a user to send/receive mail, any form may be included.

Reference numeral 105b shows a temporary storage part. The temporary storage part 105b is for temporarily storing the received mail. The received mail is temporarily stored in this storage part.

Reference numeral 112 shows a control means. The control means 112, like the embodiments which are shown in FIG. 1, is provided with a control input part 112a. When the received mail contains virus mail, it outputs a signal for deleting the recorded content of the temporary recording means (not shown) and the stored data of the execute means 105. After deletion, it outputs a signal to the control input part 104a of the disconnect control means 104 for connecting the recording means 111a and the temporary recording means. It is provided with a circuit or means for moving, recording, and copying the programs and other recorded data of the recording means 111a in the temporary recording means. Note that, the control means 112 can take a hardware configuration or software configuration, but at least one of a state where the functions and operations cannot be changed is preferable.

The control means 112 may connect with the sending/receiving means 103, storage means 111a, temporary storage part 105b, execute means 105, holding means 108, and mail drafting means 109 and may output a signal for starting or stopping operation or erasing the stored content of another storage device.

Reference numeral 106 shows a judging means. The judging means 106 is a means which is formed, in the same way as the execute means 105, by a computer which is provided with a CPU and memory, a custom IC using an ASIC, etc. and judges whether the mail text and mail attached file and other mail-related data have been infected by a virus.

The judging means 106, for example, may be provided with existing virus check software (program), data showing a virus, and a database which can be compared with the program. Further, the judging means 106 may perform multitask simultaneous processing or processing arranged in time series in the computer of the execute means 105 and execute a virus test before and after the mail display step in execute processing.

Furthermore, the judging means 106 may monitor the output of a signal to the I/O ports of the execute means 105 or movement of data which occurs when running a comparison against data which indicates an ordinary virus or a virus program operates, detect a digital signal which aims at network connection from a port without relation to mail display and from which no signal is usually output, count the amount of digital output etc. and, when exceeding a predetermined value, output the fact of a virus being present in the mail-related data. Further, it may also be provided with software which outputs a warning when an error occurs with no relation to the mail execution operation or when a computer which executes a so-called virus program etc. is hung up. In this case, sometimes it is possible to detect the presence of an unknown virus.

Note that, a virus program which is controlled in operation by mainly time may, for example, be detected by advancing the time, observing the operation, and monitoring for the presence of a virus from the state of output to the I/O ports etc.

Reference numeral 107 shows a deletion holding means. The deletion holding means 107 is formed by a RAM, ROM, or other storage chip, storage medium, or storage area. Data which is infected by a virus is temporarily held with this means. In some cases, the data is deleted by operating a delete button etc. The deletion is preferably full deletion.

Reference numeral 107a shows an archiving means. When an unknown virus is detected, the archiving means 107a archives data in a non-executable state, for example, encrypted, compressed, etc. When there is a demand from the outside to prepare an anti-virus program, for example, a state is set which enables output based on control output of the control means 112 and the data is output.

The deletion holding means 107 may record the data to be fully erased until the execute program of the received mail ends and be differentiated from the archiving means 107a.

Reference numeral 108 shows a holding means. The holding means 108 includes a device in which data is temporarily held when a virus is not detected such as a RAM or other readable/writable storage chip, storage medium, or specific storage area on a hard disk. In some cases, it may be connected with a mail drafting means 109 so that data may be attached as a forwarded file to mail.

Reference numeral 109 shows the mail drafting means. The mail drafting means 109 drafts mail, forms attached files, designates reception, etc. based on the specifications of general mailer software (program).

The mail drafting means 109 is connected with the execute means 105. After a virus is fully deleted, the execute means 105 sets the disconnect control means 104 to the connect state, then forms a connect state with the sending/receiving means 103. The mail drafting means 109 sometimes may not only be configured as a separate configuration which has the same configuration as the execute means 105, but may also be realized in the execute means 105 in a multitask or time-series manner.

Reference numeral 110 shows a mail display means. The mail display means 110 is formed by a computer display etc. which displays attached files, displays operations, etc.

Reference numeral 111a shows a storage means. The storage means 111a is a readable/writable recording part. As the storage means 111a, a hard disk, SD card, USB memory, or other media may be illustrated and is suitably selected by the size of the base unit 100b. The holding means 108, temporary storage part 105b, and deletion holding means 107 may be formed by the storage means 111a, but in accordance with need, may also be formed by separate storage devices if considering security.

The storage means 111a connects with the disconnect control means 104. This is to prevent a virus of a Trojan horse type which would affect the execution of the execute means 105 from invading the storage part to store data there or rewrite or alter data.

Reference numeral 111b shows the second storage means. The second storage means 111b is a part which temporarily records a program etc. which are started up at the execute means 105. The second storage means 111b is connected with the storage means 111a through the disconnect control means 104. When the disconnect control means 104 is set to the connect state, the control means 112 moves and copies the programs and other data from the recording means 111a to the second storage means 111b.

Next, the operation of the embodiment which is shown in FIG. 2 will be explained.

The sending/receiving means 103 of the base unit 100b is connected with the network 102 by wired or wireless connection. In the state where the disconnect control means 104 connects the sending/receiving means 103 and execute means 105, the execute means 105 receives the e-mail which is temporarily recorded at the mail server 101 based on a reception instruction signal etc. which is input from the control input part 105a.

After reception is finished, the control means 112 outputs a signal for disconnect through the control input part 104a of the disconnect control means 104. The disconnect control means 104 disconnects data transmission between the execute means 105 and sending/receiving means 103 and disconnects data transmission between the storage means 111a and the second storage means (temporary storage means) 111b.

The received mail which is temporarily stored in the temporary storage part 105b is opened and executed both for the mail text and attached files by the execute means 105 based on input from the input part 105a or automatically when automatic operation is set or is displayed at the mail display means 110 based on an input signal of the user from the input part 105a.

After being displayed at the mail display means 110, the received mail of the temporary storage part 105b is suitably erased. This erasure may be performed by input of the user from the control input part 112a or by automatic erasure when automatic erasure is set. Note that, this erasure is preferably full erasure such as in the function of a general use mailer.

Until being erased, the control means 112 continuously outputs an instruction signal for breaking the connection to the control input part 104a of the disconnect control means 104.

Next, when archiving, forwarding, or replying to received mail or when desiring to detect viruses, the judging means 106 tests this mail text and attached files or detects a code which is generated when mail or an attached file is opened and judges if a virus has infected them. The judging means 106 may sometimes also run a virus test before displaying the received mail at the mail display means 110 or at the same timing.

When infected, the infected mail-related data is moved to the deletion holding means 107. When there is such infection, for example, an audio warning or visual warning may be output from an attached speaker or the mail display means 110.

The control means 112 outputs a signal which maintains the disconnect state of the disconnect control means 104.

The user deletes this infected mail-related data by, for example, operating a button on a terminal or a virtual button to fully erase the data through the control input part 112*a*.

When fully erased or when the virus software is rendered substantially harmless or when the control means 112 erases the recorded data of the second storage means 111*b* or when both, the control means 112 outputs a control signal through the control input 104*a* to the disconnect control means 104 in the disconnect state to perform an operation to switch the execute means 105 and sending/receiving means 103 in the disconnect state to the connect state.

Note that, when the virus is of a type which destroys a system program or of a type which acts as a parasite etc., sometimes the system program on the execute means 105 which may be infected may be erased by the control means 112, then the control means 112 may be used to switch the disconnect control means 104 to the connect state to copy the program data of the storage means 111*a* to the second storage means 111*b* of the execute means 105 and move and record data in that state.

Rendering virus software substantially harmless, for example, means alteration, partial erasure, encryption, compression, or another state where execution as a program itself is not possible. Furthermore, it includes a state where input/output of data of the deletion holding means 107 is disconnected or reliably restricted. Other means may also be adopted.

When not infected by a virus, the mail-related data is moved to the holding means 108 where it is temporarily stored.

Note that, such a judgment operation of the judging means 106 sometimes may be performed only when forwarding mail, replying to it, or otherwise sending mail-related data.

The mail drafting means 109 operates when a user uses an equipped keyboard, virtual keyboard, etc. to draft transmission use mail and sends mail which is stored in the holding means 108 and does not contain a virus in a state attached to that mail through the sending/receiving means 103, but when the disconnect control means 104 is set to the disconnect state, transmission is disconnected and is not possible. Sometimes it is preferable that the drafted mail be temporarily archived, and the mail be sent when the disconnect control means 104 is released from the disconnect state and is set to the connect state.

Further, the disconnect/connect operation of the sending/ receiving means 103 and the execute means 105 and the disconnect/connect operation of the execute means 105 and the storage means 111*a* in the disconnect control means 104 by the control signal of the control means 112 may be performed simultaneously with the deletion or de facto harmless rendition of the virus mail in the execute means 105. Further, sometimes, in the middle of the mail opening operation at the execute means 105, data which is stored in the storage means 111*a* becomes necessary, so when a security area is secured in the storage means 111*a* etc., this may be performed separately.

When the judging means 106 judges that the virus mail which has infected the received mail is an unknown virus, it encrypts and compresses it to archive it in the archiving means 107*a*. The virus mail may be archived so as to be able to be taken out as desired in order to form a program for preventing virus infection.

The control means 112 sometimes may output a signal restricting data which is held in the deletion holding means 107 from being read out by an output signal etc. of the execute means 105 or by execution of a virus program.

The other stored data and programs which are recorded in the second storage means 111*b* etc. are preferably fully erased by a digital control signal which the control means 112 outputs. In this case, the control means 112 outputs a signal for the disconnect control means 104 to connect the storage means 111*a* and the second storage means 111*b* to the control input part 104*a*, then moves and copies the programs etc. which are recorded in the storage means 111*a* to the second storage means 111*b*.

According to the above example of operation, insofar as just reading the received mail, no specific operation is performed and no care has to be paid in order to read the mail. Further, infection by a virus is blocked by the disconnect control means, so stable mail operations are made possible without infection of the execute means itself.

[Fourth Embodiment]

Next, referring to FIG. 3, a fourth embodiment of the present invention will be explained.

In the embodiment which is shown in FIG. 3, reference numeral 20*a* shows the configuration of a computer terminal for connection with the base unit 20*b* inside a usually used general or dedicated computer terminal. The base unit 20*b* is the same as the base units of the embodiments which are shown in FIG. 1 and FIG. 2.

Reference numeral 201 shows a mail server. The mail server 201 is the same as the mail server 101 which was shown in FIG. 1. Further, reference numeral 202 shows a network. The network 202 is the same as the network 102 which is shown in FIG. 1. Accordingly, explanations of the mail server 201 and network 202 here will be omitted.

Reference numeral 203 shows a sending/receiving means. The sending/receiving means 203 may have a mail drafting and sending/receiving function of a generally used mailer. The illustrated sending/receiving means 203 is provided with a temporary recording part 203*a* which temporarily records mail.

The temporary recording part 203*a* preferably temporarily records the received mail. When the received mail is moved by a moving means 204 in the direction of the base unit 20*b*, it is preferably erased or encrypted or compressed to render it harmless. Further, the received mail in the temporary recording part 203*a* being encrypted, compressed, or otherwise reversibly altered until being moved by the moving means 204 to the base unit 20*b* is sometimes preferable in the point of lowering the risk of opening mail at a computer terminal 20*a*.

The moving means 204 moves and sends mail which is received by the sending/receiving means 203 in the direction of a connect control means 205 as is. The moving means 204 preferably is provided with the function of moving the received mail automatically in the direction of the base unit 20*b* or of moving it by operation of the user.

Reference numeral 20*c* shows a connect means. The connect means 20*c* is formed by a USB cable, USB connection mechanism, or other wired connection or by infrared rays, visible light, radio waves, or other wireless connection.

The connect control means 205 is provided with an input/output part of a type which can transfer data with the connect means 20*c*. The connect control means 205 is, for example, an Ethernet® specification terminal, infrared ray receiving part, wireless sending/receiving front end circuit, etc. Furthermore, the connect control means 205 breaks or makes the connection of the base unit 20*b* and the computer terminal 20a and is formed by a logic circuit, relay, electronic switch, etc., but is suitably selected by the type of the connect means 20c.

Note that, the connect control means 205 is not limited to a configuration for such a purpose. Sometimes it is also possible to form a plug and socket relationship by which a connect means 20c which extends from the base unit 20b is detachably attached to the computer terminal 20a. This is because if pulling apart the connect means 20c which extends from the computer terminal 20a and the base unit 20b, even if the received mail which has been moved once to the base unit 20b is infected by virus software, the virus software will never move to the computer terminal 20a. By making this a detachable type in this way, infection by virus software can be easily blocked.

Reference numeral 206 shows an execute means which connects the input part 206a from the user and temporary recording part 206b. The execute means 206 is configured in the same way as explained by the embodiments of FIG. 1, so the explanation will be omitted here.

Further, the execute means 206 may be formed by a CPU which can use only a single operating system, for example, a WINDOWS® based one, and also a CPU which can use ANDROID® and UNIX® as well (for example, an INTEL® ATOM processor (made by Intel) etc.) and peripheral devices.

In this case, the present embodiment can greatly increase the types of virus programs which can be detected. Further, a plurality of CPUs may be used to install corresponding operating systems.

Alternatively, even with a CPU which operates by only WINDOWS®, by using a program which runs ANDROID® on WINDOWS®, it is possible to use a single CPU to operate application programs corresponding to a plurality of different operating systems.

Reference numeral 207 shows a holding means, reference numeral 208 shows a mail display means, reference numeral 209 shows a judging means, reference numeral 210 shows a deletion holding means, and reference numeral 211 shows a storage means. These means are respectively configured in the same way as in the embodiments which are shown in FIG. 1, so explanation will be omitted here.

Preferably, the storage means 211a connects with the execute means 206 through the connect control means 205, the storing means 207 connects with the connect means 20c through the connect control means 205, and the control signal from the execute means 206 is used for disconnect or connect of connections. The disconnect and connect, as explained in the embodiments of FIG. 1, may be performed simultaneously or separately.

Reference numeral 211b shows a second storage means. The second storage means 211b is formed by a RAM or other memory for temporarily recording a mailer (program) etc. which the execute means 206 which is recorded in the storage means 211a executes or a program which the execute means 206 executes.

Reference numeral 212 shows a control means. The control means 212 is comprised of a gate array, logic ICs, etc. in combination and may electrically connect with the connect control means 205, second storage means 211b, execute means 206, judging means 209, deletion holding means 210, or other parts of the configuration. The control means 212 sometimes outputs signals which start or stop operations of the different means mentioned above or outputs signals for recording data or erasing temporarily recorded data by the second recording means 211b or other means besides the holding means 207.

Furthermore, the control means 212 operates to move and record program data of the recording means 211a to the second recording means 211b after reset.

Note that, the control means 212 sometimes outputs a signal to perform control to connect the temporary recording part 203a and moving means 204 at the computer terminal 20a side in a controllable manner and stop the readout of the received mail inside the temporary recording part 203a to the outside etc. or outputs a signal to start or stop movement of data of the moving means 204.

Next, the operation of the embodiment which is shown in FIG. 3 will be explained.

In the computer terminal 20a, the sending/receiving means 203 and moving means 204 are installed in advance in the form of programs or a medium in which the programs are recorded in advance is inserted. These means may also be formed as electrical circuits which are mounted on a PCI specification board or formed by USB connection type circuits etc. which are mounted in the computer. Note that, the mail drafting means is built in the computer side and is omitted in FIG. 3.

The base unit 20b is attached to the computer terminal 20a. In the case of USB connection, it is inserted for mounting. In the case of wireless connection, it is set at a distance enabling data to be sent/received. A wired or wireless connect means 20c is therefore formed.

The received mail which is recorded in the mail server 201 is input through the network 202 to the sending/receiving means 203 of the computer terminal 20a and is recorded in the temporary recording part 203a upon demand based on an operation of the user on the computer terminal 20a.

In this case, the received mail which is recorded in the temporary recording part 203a preferably is in a state which cannot be opened on the computer due to the control signal of the control means 212, settings of the computer terminal 20a, etc. The received mail is output through the moving means 204 and connect means 20c to the connect control means 205 based on a control signal which is input from the user through the control input part 212a or a control signal form the control means 212 which is automatically output. The execute means 206 outputs a signal which shows the connect state to the control input part 206c of the connect control means 205 and records the received mail at the temporary recording part 206b.

The control means 211 outputs a signal which shows the disconnect state to the control input part 206c of the connect control means 205 to make it form a disconnect state. In some cases, an operation is performed to separate the base unit 20b from the computer terminal 20a so as to substantially form a disconnect state.

At this time, the received mail which is stored in the temporary recording part 203a is sometimes preferably fully deleted or altered, encrypted, or password protected and compressed in a state making easy decompression impossible and therefore to be rendered harmless. Further, when separating the base unit 20b and the computer terminal 20a, the electrical connection between the control means 212 and temporary recording part 203a and moving means 204 is also broken, so, in this case, sometimes preferably the control means 212 and the temporary recording part 203a maintain a connected state.

In this separated state, the execute means 206 opens the received mail and displays it at the mail display means 208. At this point of time, the virus cannot divulge information to the outside through the network, so when forming a base unit aimed at such a virus, sometimes a judging means etc.

are unnecessary. Note that, in this case as well, sometimes it is also possible to provide the control means 212 and read a program from the storage means 211a every time executing a program which would open different received mail-related data so as to de facto erase the previous program and use a new program for an execution operation to open the received mail-related data.

When the execute means 206 opens mail, the connection of the storage means 211a and the execute means 206 is broken by the connect control means 205 by a control signal from the control means 212. Such a disconnect is sometimes preferable in the point that when including a program which configures an execute means etc. in the readable/writable storage means 211a and controlling the system as a whole, a virus program cannot invade the storage means 211a.

The received mail is inspected by a virus test such as shown in the embodiment of FIG. 2 by the judging means 209 before or after or simultaneously with the execute means 206 starting up the mailer.

When the received mail is infected by a virus program, the control means 212 breaks the connection between the storage means 211a and execute means 206 at the connect control means 205 and the connection between the connect means 20c and the execute means 206 while moving the received mail to the deletion holding means 210 where it is fully deleted or treated to render it harmless.

When the deletion holding means 210 fully deletes or renders harmless the received mail, the execute means 206 sometimes switches the connect control means 205 from the disconnect state to the connect state, but when a virus program invades the system area and destroys the system etc., the control means 212 may erase all of the recorded data of the temporary recording part 206b and buffer memory etc. and then switch the connect control means 205 from the disconnect state to the connect state.

In this case, the control means 212 preferably moves and copies the program data of the storage means 211a to the second storage means 211b to enable the execute means 206 to execute the program.

When the judging means 209 judges that the received mail is not infected by a virus, the received mail is moved to and stored at the storing means 207, and the connect control means 205 changes the connect state of the connect means 20c and execute means 206 and the disconnect state of the storage means 211a and execute means 206 to the connect state.

The mail text and attached files of received mail which is stored in the storing means 207 and not infected by a virus can be rendered a state enabling attachment, appendage, etc. to mail which is prepared by the sending/receiving means 203 in the computer terminal 20a by a control signal from the control means 212.

In the present embodiment, it is possible to omit the mail sending/receiving means etc. of the base unit 20b and form a more streamlined base unit.

Note that, in the same way as the embodiments of FIG. 1, in the case of only the function of displaying the mail-related data, sometimes the control means 212 is left and the judging means 209, deletion holding means 210, and holding means 207 become unnecessary.

In this case, sometimes it is preferable that the base unit 20b be set so that the function of displaying the text of the received mail, attached files, and other received mail-related data on the mail display means 208 and, when the user checks for the presence of any infection by a virus program and there is no virus infection, enabling the computer terminal 20a to again receive the received mail from the mail server 201 or, when received mail which appears to be mail with a virus infection is displayed on the mail display means 208, deleting that mail which was temporarily recorded in the mail server 201 be performed by the control means 212 or computer terminal 20a. According to this embodiment, the configuration can be streamlined by an amount equivalent to provision of the configuration for drafting reply and forwarded mail at the computer terminal 20a.

[Fifth Embodiment]

Next, referring to FIG. 4, a fifth embodiment of the present invention will be explained. Note that, FIG. 4 shows an embodiment which connects to a usually used computer terminal 30a and therefore uses a base unit 30b designed more as an attachment.

Figure 4:
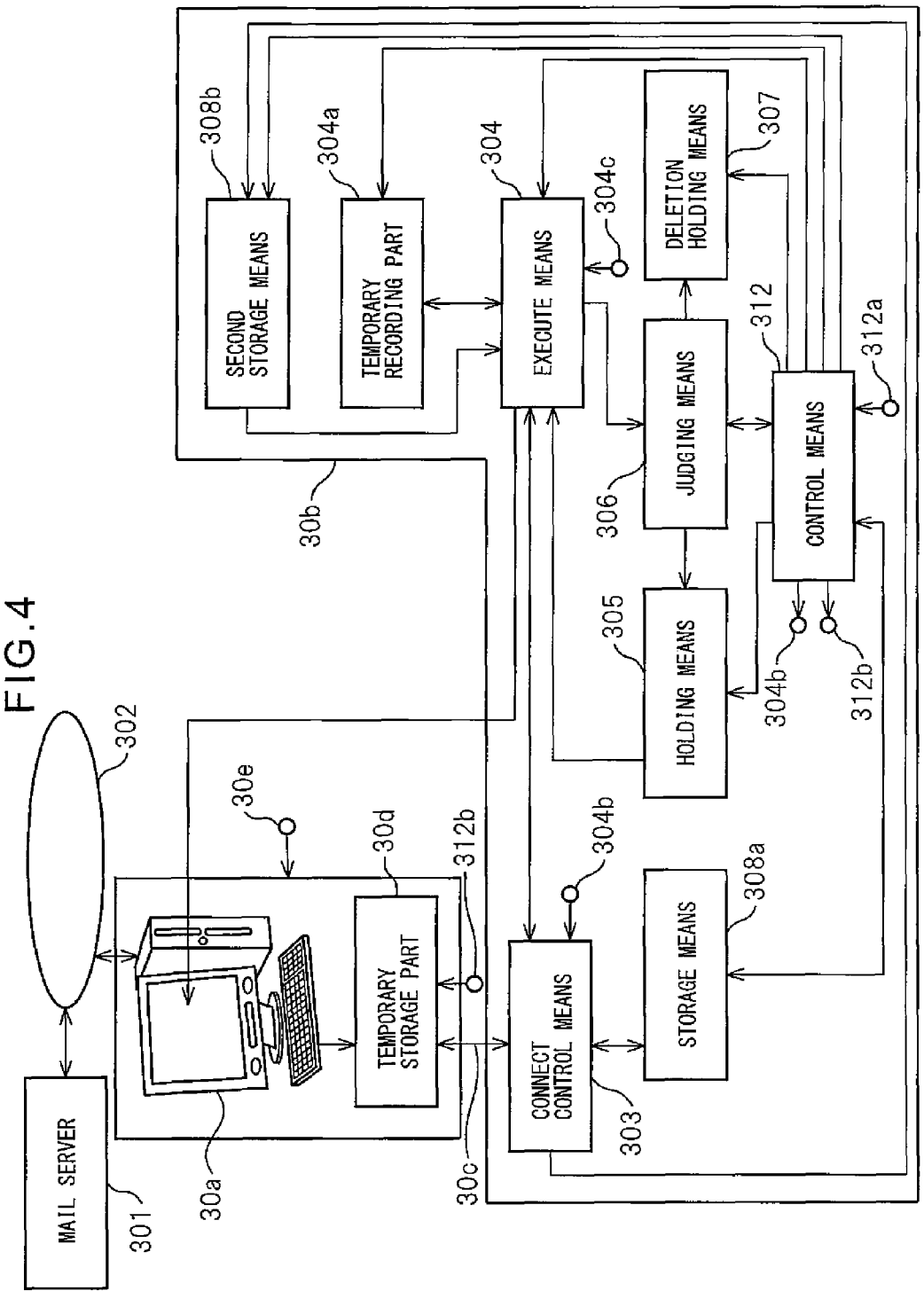
FIG. 4 is a block diagram which shows a fifth embodiment of the present invention.

In the embodiment of FIG. 4, reference numeral 301 shows a mail server, while 302 shows a network. Each of these has the same configuration as explained in advance with reference to FIG. 1 to FIG. 3.

Reference numeral 30a shows a computer terminal. As the computer terminal 30a, for example, a desktop type or notebook type of computer which is provided with a keyboard, monitor, or mouse, a mobile phone, smartphone, or other type etc. may be illustrated. The computer terminal 30a may have a mailer (program) for drafting mail, receiving it, etc. installed in it.

Reference numeral 30d shows a temporary recording part. The temporary recording part 30d is a recording part which temporarily archives the received mail and is configured by a hard disk, USB memory, or other recording part.

Reference numeral 30e shows an input part. The input part 30e is an input part by which a user inputs a signal while utilizing a keyboard, virtual keyboard, mouse, or touchpad which is provided at the computer terminal.

A connect means 30c forms a connect state by a wireless or wired connection in the same way as previously explained with reference to FIG. 3.

Reference numeral 303 shows a connect control means. The connect control means 303 connects a storage means 308a and an execute means 304 and connects and disconnects the connect means 30c and the connect control means 303 etc. based on a control signal of the execute means 304.

Furthermore, the connect control means 303 erases the received mail which is recorded in the temporary storage part 30d based on a control signal of the execute means 304 and outputs a signal which enables display and execution at the computer terminal 30a side.

The execute means 304 is provided with a keyboard, touchpad, or other control input part 304a which forms an interface with the user and is configured in the same way as the embodiments which are shown in FIG. 1 and FIG. 2.

Furthermore, the execute means 304 performs an operation which deletes the received mail of the temporary recording part 30d through the connect control means 303 and an operation which enables reading at the computer terminal 30a side.

Further, the execute means 304 is configured to connect with the display monitor of the computer terminal 30a and, when the received mail is executed on the execute means 304, to display the execute state on the monitor of the computer terminal 30a.

The function of displaying the output of the execute means 304 on the computer terminal 30a only utilizes the monitor of the computer terminal 30a to display the received mail which was output by the execute means 304. Sometimes the image display buffer memory is shared to an extent not being affected by a virus program.

Reference numeral 304a shows a temporary recording part which temporarily stores the received mail. Preferably, the temporary recording part 304a is recorded at when the mail has finished being displayed after a virus test has finished and the content is fully deleted when a virus infection has become clear.

Reference numeral 304b shows a control input part. The control input part 304b is a part for input of a signal for breaking or making the electrical connection between the temporary storage part 30d of the connect control means 303 and the execute means 304 and between the storage means 308a and the second storage means 308b.

Reference numeral 305 shows a holding means, 306 a judging means, 307 a deletion holding means, and 308a a storage means. These are configured and operate in the same way as the embodiments which were previously explained with reference to FIG. 1 and FIG. 3. Note that, when just viewing mail, the holding means 305 etc. sometimes may be omitted.

Reference numeral 312 shows a control means. The control means 312 is configured by a gate array, logic ICs, or computer restricted in writing and connects to the storage means 308a, judging means 306, deletion holding means 307, execute means 304, temporary recording part 304a, and second storage means 308b to start or stop the operations of the various parts or control other operations. Note that, the control means 312 may also connect to the temporary storage part 30d which is connected to the computer terminal side through a terminal 312b.

The control means 312 receives as input a signal indicating when the judging means 306 has detected virus mail and outputs a reset signal to erase the stored data of the second storage means 308b or data of other related storage devices. Further, the control means 312 is provided with the function of connecting with the control input part 304b of the connect control means 303, outputting a signal for switching the storage means 308a and the second storage means 308b from a disconnect state to a connect state, or moving and copying recorded programs and other recorded data of the storage means 308a to the second storage means 308b.

The control means 312 is provided with a control input part 312a. It may use control input received from the user through a keyboard, touchpad, or other man-machine interface as the basis to output control signals or perform control functions or use preset circuits and programs as the basis for automatic operation.

Reference numeral 308a shows a storage means for storing data similar to the storage means 211a which is shown in FIG. 3. Further, reference numeral 308b shows a second storage means which stores data similar to the second storage means 211b which is shown in FIG. 3.

Next, the operation of the embodiment which is shown in FIG. 4 will be explained.

The received mail which is recorded in the mail server 301 is recorded in the temporary storage part 30d of the computer terminal 30a by input of a reception request signal by a user from the input part 30e or automatically through the network 302.

On the computer terminal 30a, for example, the user makes the mouse pointer move to a mailer program startup icon or virus check icon and double clicks or otherwise operates it to start up the program. Due to this startup, the monitor of the computer 30a may display a message of the start of a virus check operation (not shown).

When a control signal which instructs connection is input from the control means 312 to the control input part 304b of the connect control means 303, the connect control means 303 performs a connect operation including transmission of data between the temporary storage part 30d and storage means 308a and the execute means 304.

The execute means 304 receives as input the received mail which is recorded at the temporary storage part 30d through the connect control means 303 and temporarily records it at the temporary recording part 304a.

When a control signal which instructs disconnection is input from the control means 312 to the control part 304b of the connect control means 303, the connect control means 303 breaks the connection including data transmission between the temporary storage part 30d and storage means 308a and the execute means 304.

In the disconnect state, the received mail which is recorded at the temporary storage part 30d is executed and output for display on the monitor of the computer terminal 30a.

The execute means 304 displays the received mail which was recorded in the temporary recording part 304a on the monitor of the computer terminal 30a or other external display means.

The judging means 306 runs a virus test on the received mail and, when it is not infected by a virus, moves the received mail to the holding means 305 or outputs a signal to the connect control means 303 and control means 312 through the connect means 30c so as to lift the ban on opening the received mail which is recorded in the temporary storage part 30d.

The control means 312 outputs a signal which indicates the connect state to the control input part 304b of the connect control means 303 so as to connect the execute means 304 and the temporary storage part 30d.

The judging means 306 moves any received mail which is infected by a virus to the deletion holding means 307. When moving the received mail, the means 307 fully deletes it or encrypts it, compresses it, or alters it to render it harmless.

Furthermore, the execute means 304 may display a warning on a monitor etc. through the connect control means 303 and connect means 30c that the received mail of the temporary storage part 30d is infected by a virus.

The control means 312 fully deletes or renders harmless the received mail of the temporary storage part 30d.

Furthermore, based on an output signal of the judging means 306 which shows virus infection, the control means 312 outputs a signal which erases the stored data of the second storage means 308b and furthermore outputs to the control input part 304b of the connect control means 303 a signal to restart the connection which had been broken between the storage means 308a and the second storage means 308b so as to move a program which is stored at the storage means 308a to the second storage means 308b to enable the execute means 304 to execute the next received mail.

The control means 312 sometimes outputs a signal to the temporary storage part 30d to delete received mail which is infected by a virus or outputs data which identifies the received mail which is infected by a virus to the computer as warning information.

The operation which is shown in FIG. 4 can streamline the base unit 30b more while facilitating processing to delete virus infection.

[Sixth Embodiment]

Next, referring to FIG. 5, a sixth embodiment of the present invention will be explained.

Figure 5:
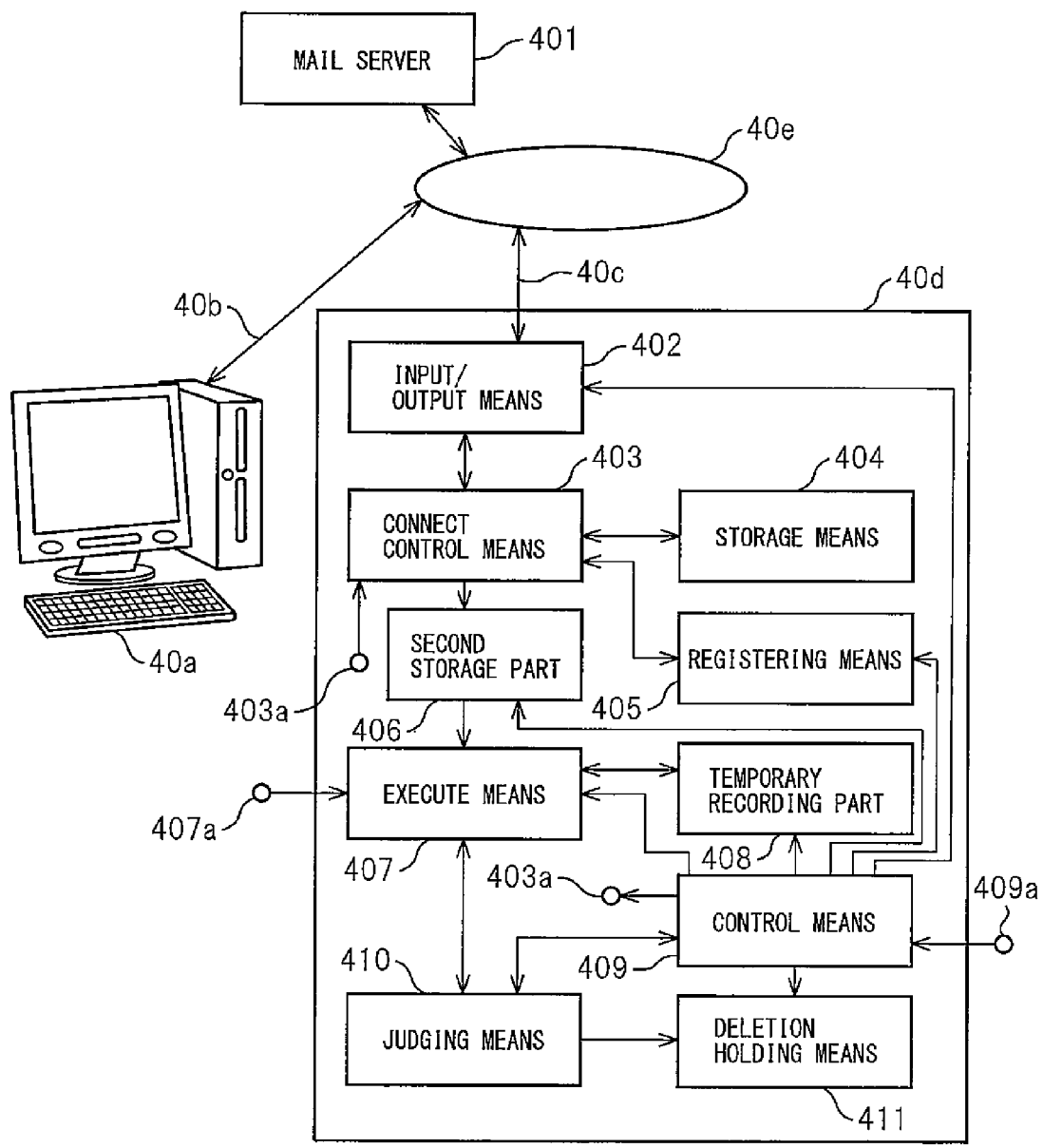
FIG. 5 is a block diagram which shows a sixth embodiment of the present invention.

In the embodiment of FIG. 5, reference numeral 401 shows a mail server. As the mail server 401, for example, one which is provided with specifications which enable it to temporarily record the received mail and either send it to a terminal in accordance with a request from the terminal or delete it may be illustrated. The mail server can, for example, delete the mail by instruction of an execute means 407.

Reference numeral 402 shows an input/output means. The input/output means 402 is a means for connecting with an Internet router, modem, etc. by a wired or wireless connection. As the input/output means 402, for example, an Ethernet® connection, USB connection, antenna, front end circuit which oversees demodulation/modulation, etc. may be mentioned. This means need only be one which can connect with, at least, a mail server. In addition, the input/output means 402 may, if necessary, be configured to connect with an Intranet, Extranet, public line, or mobile phone line.

Reference numeral 403 shows a connect control means. The connect control means 403 is a device which has two or more input terminals such as a NAND, NOR, or other logic circuit, a relay, switch device, array of switching devices, or other part which breaks or makes electrical connection by an external input signal.

The operation for breaking or making an electrical connection of the connect control means 403 includes breaking or making connection between the input/output means 402 and the execute means 407, connection between the input/output means 402 and a second storage part 406, connection between the input/output means 402 and a control means 409, and connection between the input/output means 402 and a judging means 410 first and foremost and also connection between a storage means 404 and the execute means 407, connection between the storage means 404 and the second storage part 406, connection between a registering means 405 and execute means 407, and connection between the registering means 405 and the second storage part 406. Note that, sometimes it is also possible to break/make only part of these connections rather than break/make all of these.

The disconnect/connect operation of the connect control means 403 includes, for example, the operation of disconnection when finishing receiving the received mail. Connection may be started when the mail which is stored in the second storage part 406 is all processed and erased or connection may be started when due to operation of the control means 409, the data relating to mail at the different storage parts is erased other than at a deletion holding means 411. Further, for example, it may disconnect the temporary recording part 408 when it records received mail. This disconnect operation, for example, when performed by software, may be performed by software which is stored in advance in the ROM.

Reference numeral 404 shows the storage means. The storage means 404 is configured by a RAM, SD memory, USB memory, etc. The storage means 404 records a mailer (mail program) which operates to execute mail or open attached files and stores a judgment program etc. for detecting a virus. The storage means 404 may sometimes have a connect part with the outside when enabling upgrades of the mailer (mail program) or judgment program. This connect part, for example, may be of a specification which records an upgraded version of a program in an SD media, USB memory, etc. and, if necessary, is changed with each program or a specification which acquires a program from an external computer through a USB connection, infrared ray connection, etc.

Reference numeral 405 shows a registering means. The registering means 405 registers a mail address, password, account, POP account, SMTP account, etc. This registration, in the same way as the storage means 404, can be performed by input from the outside, but preferably the information is registered once in the registering means 405 and set to be unable to be overwritten in the internal execute means 407 etc.

Reference numeral 407 shows an execute means and is preferably a computer specification of a type of an extent which starts up a mailer in the same way as an ordinary computer.

The execute means 407 is preferably a computer type which is provided with a RAM, ROM, and CPU, but may also be a means using a gate array. The execute means 407 preferably executes Microsoft OUTLOOK®, OUTLOOK EXPRESS®, or other generally used mailer software and provides an environment for sending/receiving mail, deleting mail at the server, display of mail, or other general software operations. Further, the execute means 407 is preferably in a state where virus mail can be executed, but in accordance with need, if at least enabling mail to be executed in the above way, it may be formed by recording a program in a ROM (read only memory) or may be formed by a gate array or other hardware IC etc.

Further, the execute means 407 may be made able to output a signal for deleting mail to the mail server 401 when the judging means 410 judges there is virus infected mail.

Further, the execute means 407 outputs a signal which controls the connect and disconnect operations of the connect control means 403.

Reference numeral 406 shows the second storage part. As the second storage part 406, for example, a RAM (random access memory) specification chip which temporarily stores data so as to make the storage means 404 be executed by the execute means 407 may be illustrated.

Reference numeral 408 shows a temporary recording part. The temporary recording part 408 is a recording part for temporarily recording the input received mail.

Reference numeral 409 shows a control means. The control means 409 connects with the input/output means 402, storage means 404, registering means 405, execute means 407, second storage part 406, and judging means 410 and outputs signals for starting and stopping the different parts and performing other control. The control means 409 connects with the control input part 403*a* of the connect control means 403 and outputs a signal for connecting and disconnecting the different parts which are connected to the connect control means 403. Further, the connect control means 403 outputs a signal for electrically erasing data which is recorded at the different sections around the execute means 407 and the judging means 410. The control means 409, like in the other embodiments, is configured by a combination of storage devices which are controlled to be unable to be rewritten and a CPU or a combination of an ASIC and logic IC. The control means 409 sometimes erases the recorded or stored content of the temporary recording part 408 etc., then outputs a signal for forming a connect state to the control input part 403*a* of the connect control means 403.

The control input part 409*a* of the control means 409 connects with a man-machine interface with a user. However, the present embodiment sometimes need not display the mail. An interface of an extent which detects virus infected received mail and operates to delete received mail at the mail server 401, for example, a plurality of buttons and a display use LED, is sufficient. Further, the control input part 407*a* of the execute means 407 sometimes need only be a similar interface.

Reference numeral 410 shows a judging means. The judging means 410 inspects the text of the received mail or the attached files of the received mail or opens them and checks for abnormal states of operation. It moves received mail which it has judged that a virus has infected to the deletion holding means 411 to render it harmless. In some cases, it deletes it by external input. When the judging means 410 is realized by a program, the execute means 407 sometimes may also play that role.

Further, the judging means 410 sometimes stores a virus related definition file in an updateable manner, but sometimes preferably is further provided with a means for detecting the state of a signal of an output terminal of the I/O output terminal of the execute means and monitoring, for example, whether data is output in the network 40e direction without regard as to mail reception or operations for opening attached files and, when such data is output, identifying the received mail as being virus infected.

Reference numeral 411 shows a deletion holding means. The deletion holding means 411 is a means for archiving the mail which is infected with the virus rendered harmless by encrypting, compressing, or otherwise processing it or for deleting it. This means may also move data to the outside by external input and decrypt it for display. This operation at least has no effect on the execute means 407 etc. It may be performed by local operation by connecting an external device and connect means based on a control signal of the control means 409 or may be displayed using a terminal which is provided with a separate decrypting means. This occurs when, for example, the judging means 410 detects an unknown virus program data and the data is made to move to the deletion holding means 411 and it is necessary to confirm that the program is a virus program.

Reference numeral 40a shows a computer terminal. The computer terminal 40a need only be installed with software enabling ordinary use and may be formed in a state enabling ordinary work. The computer terminal 40a preferably at least sets the mail address, accounts, passwords, etc. to be set and registered the same as the base unit 40d in a state where the mailer program is operating.

Reference numeral 40b shows a connect means with the network 40e. The connect means 40e, for example, is a means for connection by the Ethernet®, WAN, LAN, etc. by a wireless or wired connection. Reference numeral 40c is a similar connect means. For example, it is a connect means for connecting the network 40e and input/output means 402 by a wireless or wired connection.

The connect means 40b and 40c each connect with the network 40e through for example a router, modem, etc. Note that, in these connect means, for example, in the case of a mobile phone etc., the connection may be made through a front end circuit etc. for modulation, demodulation, and amplification by an antenna and desired frequency.

Reference numeral 40d shows a base unit. The base unit 40d, for example, need only have an LED which shows the connect state with the network 40e, operation switches, virus detection indicator, operation on/off switch, virus delete switch, etc. Note that, the base unit 40d may, in accordance with need, be connected with a liquid crystal monitor as in the embodiments which are shown in FIG. 1 etc.

Reference numeral 40e shows a network. The network 40e may be suitably selected by the mail sending/receiving connection state of the Internet, Extranet, inhouse dedicated line, mobile phone lines, public telephone lines, etc. It need only be a network which corresponds to the connection state of the user.

Next, the operation of the embodiment which is shown in FIG. 5 will be explained.

The base unit 40d records the mail address, password, etc. of the user in advance in the registering means 405. There may be a single or multiple registered users.

Data may be recorded in the registering means 405 by, for example, being input by the user through the control input part 409a of the control means 409, being input through the control input part 407a of the execute means 407, or by the registering means 405 itself being formed by a detachable memory unit.

The base unit 40d is in a state connected with the network 40e through a wired or wireless connect means 40c. The base unit 40d sometimes is preferably in a state not connected with the computer terminal 40a, but may also be connected in a contingent manner in accordance with other objectives.

In this state, the connect switch of the base unit 40d is in the on state, and the control means 409 outputs signals for starting operation to the different parts of the configuration.

Further, the program to be executed by the execute means 407 which is stored in the storage means 404 is stored in the second storage part 406, so the execute means 407 is made a state able to execute this program.

The connect control means 403 is in the connect state. If the received mail is received and recorded in the mail server 401, the received mail is fetched and stored in the temporary recording part 408 through the input/output means 402 and the connect control means 403.

The received mail in the mail server 401 may be recorded as it is or may be deleted each time received. Note that, in the present embodiment, the state where the received mail is recorded as is in the mail server 401 will be explained.

When one or more received mails are stored in the temporary recording part 408, the connect control means 403 breaks the connection of the input/output means 402 and the execute means 407 or connection of the storage means 404 and the execute means 407. The disconnect instruction is given through the control input part 403a by the execute means 407 outputting a signal. Alternatively, in accordance with need, it is also possible to monitor the recorded content of the temporary recording part 408 and output a disconnect signal by provision of a control signal output part and use this means to give a disconnect instruction.

The execute means 407 operates based on a program which is stored in the second storage part 406 and operates to open received mail which is recorded in the temporary recording part 408 or operates to display it. Along with this, the judging means 410 checks if the received mail which is recorded in the temporary recording part 408 contains a virus program. The judging means 410 may test for whether there is a match with an existing virus program pattern, but here it is configured to monitor the operation of the execute means 407 when the execute means 407 opens the related data of the received mail, for example, to connect a counter which is comprised of a logic IC etc. to one or more I/O ports from which no output is ever generated when a mail program is operating from among input/output ports which output signals to the network, connect an integration circuit which integrates output pulses to the output part of the counter, and, furthermore, connect a comparator which receives this integrated value as input at one terminal and sets a threshold value voltage at the other terminal. As this configuration, a configuration is illustrated which, when the execute means 407 operates to open mail, integrates the output value of the counter and, when reaching a predetermined threshold value which is set by the comparator or more, outputs a virus detection pulse from the comparator, judges that there is a virus program, and outputs a signal to the control means 409.

When the judging means 410 detects a program which contains a virus, it preferably records it in the deletion holding means 411 while encrypting, compressing, or otherwise processing it. Note that, the name, date, etc. of the mail are sometimes preferably archived corresponding to information not related to the virus.

When the judging means 410 detects a program which contains a virus and that virus mail is recorded in the deletion holding means 411 while being rendered harmless, the control means 409 sometimes preferably displays the fact of there being virus infected data to the user by, for example, an LED.

Furthermore, with the connect control means 403 still setting the disconnect state, the control means 409 erases the stored content other than at the deletion holding means 411.

In the state where erasure has been completed, the connect control means 403 lifts the disconnect state and forms the connect state. When in this connect state, the program which is stored in the storage means 404 and the account data which is recorded in the registering means 405 are moved and copied through the connect control means 403 to the second storage part 406 etc., the execute means 407, judging means 410, etc. again form a state enabling a mailer (program) to be executed, and the connect control means 403 forms a state for receiving the next received mail from the mail server 401 while remaining in the connect state.

In a state where the control signal of the control means 409 causes the connect control means 403 to form a connect state, mail information of received mail with a virus program which is held rendered harmless in the deletion holding means 411 may be displayed at the display part (not shown) of the base unit 40*d*, but this mail information (title of mail) may also be used as the basis for an operation to delete the virus mail in the mail server 401.

Inside the mail server 401, mail in which a virus program is contained is deleted. The user can safely perform an operation to receive and open mail at the computer terminal 40*a*. Note that, depending on the judgment of the judging means 410, sometimes misjudgment will result in noninfected mail being recorded in the deletion holding means 411, so when further preparing an antivirus file from infected mail, sometimes means may be provided for the user to decrypt, reproduce, and view the received mail which is deleted and held. It is sometimes preferable that this be confirmed by different independent terminals.

The present embodiment breaks the electrical connection with the outside when operating to execute and open the received mail and thereby disconnect operations which are targeted by virus mail and automatically performs an operation to delete mail on the mail server and thereby enables a user to perform the work of opening mail without worrying about virus infection. Such an operation can be performed without relation to the computer terminal 40*a*, so it is sufficient to connect the base unit 40*d* at all times, the burden on the user is reduced, and, further, a plurality of mail accounts may be set for users recorded at the registering means 405 to enable a single base unit to handle a plurality of computer terminals.

[Seventh Embodiment]

Next, referring to FIG. 7, a seventh embodiment of the present invention will be explained.

Figure 7:
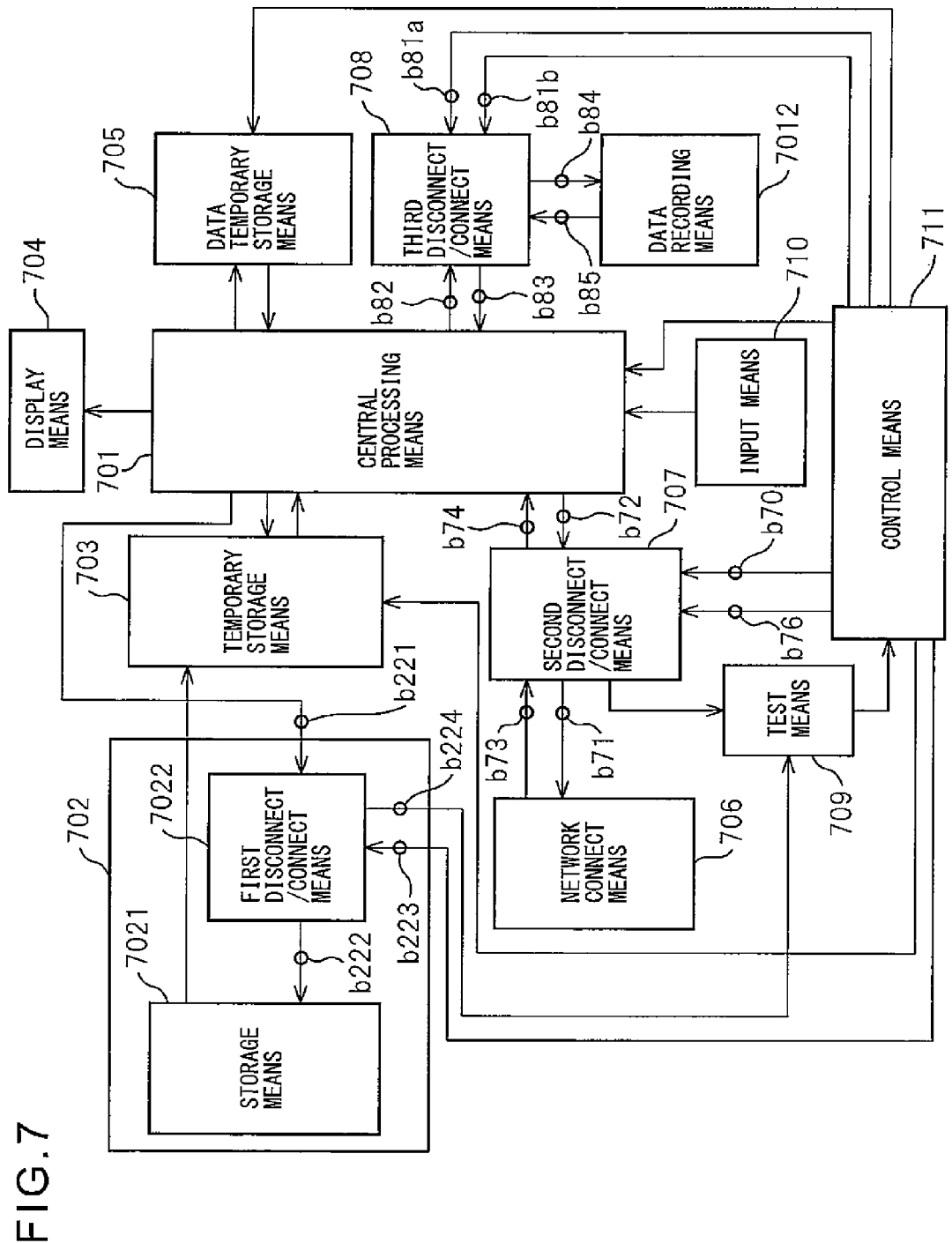
FIG. 7 is a block diagram which shows a seventh embodiment of the present invention.

In the embodiment of FIG. 7, reference numeral 701 shows a central processing means which is configured by a combination of a CPU, MPU, IO buffer, etc. The central processing means 701 is a part which uses an operating system, mailer program, browser software, and viewer program which are stored in the temporary storage means 703 as the basis to perform processing to display downloaded mail text, processing to display attached files, and processing to execute downloaded programs.

Further, the central processing means 701 outputs a packet signal based on protocol for connection with the network.

Reference numeral 702 shows a first storage part. The first storage part 702, for example, as illustrated, is comprised of a combination of a storage means 7021 and a first disconnecting/connect means 7022. A configuration is adopted in which a control signal from the control means 711 is used to make and break connections mainly at the write side.

The storage means 7021 is a hard disk, flash memory, or other rewritable storage means in which an operating system, application programs, a mailer, viewer program, HTML program, etc. are stored.

The first storage part 702 is shown as a storage device which is restricted from being written in as explained above, but in the case of a mailer or a dedicated browser device, this may be replaced with a ROM (read only memory) or also a locked USB memory, SD card, or other media etc. In the case of a terminal in which mail is mainly processed, a ROM is sometimes sufficient.

Figure 6A:
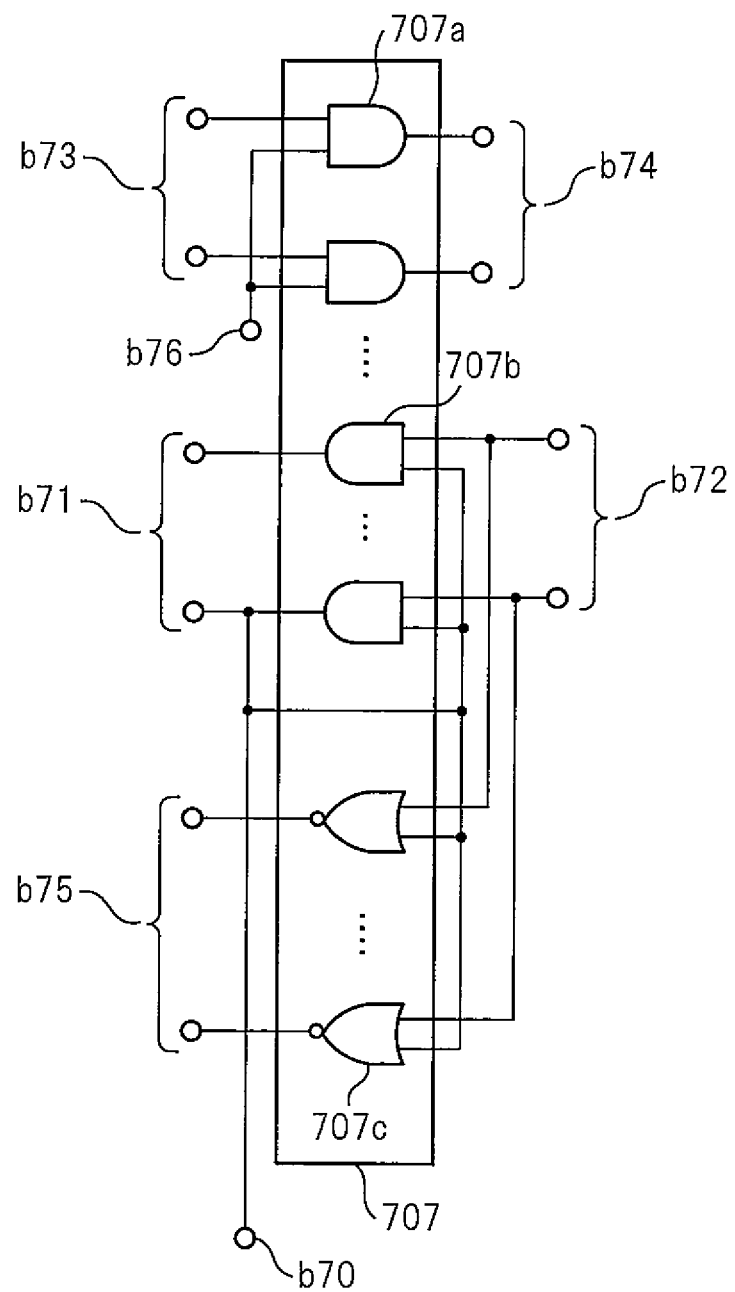
FIG. 6A is a view of the configuration which shows a circuit configuration of a disconnect/connect means which can be used in the present invention.
Figure 6B:
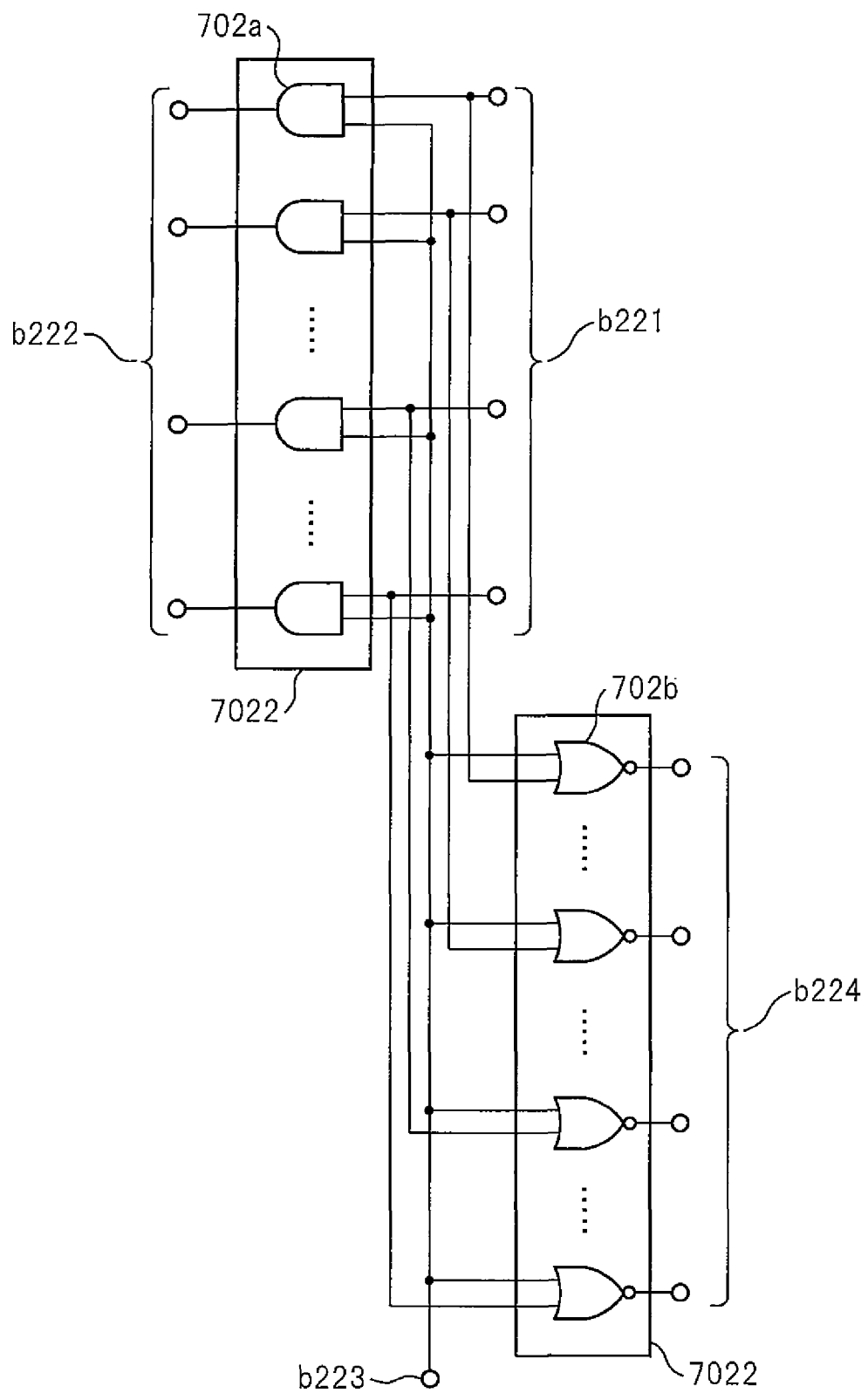
FIG. 6B is a view of the configuration which shows another circuit configuration of a disconnect/connect means which can be used in the present invention.

The first disconnect/connect means 7022, for example, as shown in FIG. 6B, is configured by a combination of logic circuits. FIG. 6B shows formation by an array of AND circuits 702*a*. Single terminals of these form a control input part b223. Furthermore, single terminals of the array of NOR circuits 702*b* are connected with the control input part b223, while the other terminals are connected to the other terminals b221 of the input parts of the array of AND circuits 702*a*.

The control input part b223 receives as input either a digital signal "1" or "0". For example, when outputting a signal "1", the digital signals which are input to the other terminals b221 of the input parts are output as they are to the output terminals b222 to form a connect state, while when a signal "0" is input to the control input part b223, the outputs of the output terminals b222 become always "0", even if the inputs of the other terminals b221 of the input parts change between "1" and "0", to form a state where transmission is disconnected.

On the other hand, if the array of NOR circuits 702*b* receive a digital signal "1" from the control input part b223, regardless of whether the other input terminals are "1" or "0", the outputs become "0" and a disconnect state is formed.

If the input of the control input part b223 becomes "0", the other terminals b221 and the output terminals b222 of the input parts change in phase by 90 degrees, but form a connect state.

The other terminals b221 of the input parts of the array of AND circuits which are shown in FIG. 6B connect with the central processing means 701, while the output terminals b222 connect with the input terminal of the storage means 7021.

The storage means 7021 is a hard disk or other readable/writable storage means, so to prevent entry of a virus program, the first disconnect/connect means 7022 is provided. Accordingly, AND circuits 702*a* and NOR circuits 702*b* are provided in numbers corresponding to the number of data buses. The output terminals b224 of the NOR circuits are connected to the test means 709.

A signal for directly writing data to the storage means 7021 is connected to the test means 709. Accordingly, when, despite startup of the RAM, a data signal is output at a timing not of a usual write operation, the test means 709 can flash corresponding to this data signal and predict the occurrence of a virus program. The first disconnect/connect means 7022 is shown as a combination of AND circuits and NOR circuits, but it is also possible to use a combination of other logic circuits.

In FIG. 6A, reference numeral 707 shows a second disconnect/connect means. The second disconnect/connect means 707 is an array of a plurality of 2-input AND circuits 707a and 707b and an array of a plurality of NOR circuits 707c, so the symbols which show the input/output terminals are made the same as those shown in FIG. 7. The AND circuits and NOR circuits are respectively shown by the reference numerals 707a, 707b, and 707c assigned to each.

Reference numeral b70 is a control signal input part which connects with single input terminals of all the devices and connects with the control signal output part of the control signal input part.

The output terminals b71 of the AND circuits 707b connect with the input part of the network connect means 706, while the other terminals b72 of the input part of the AND circuits 707b connect with the output port of the central processing means 701.

The other terminals b73 of the input parts of the AND circuits 707a connect with the output terminal of the network connect means 706, while the output terminals b74 of the AND circuits 707a connect with the input port of the central processing means 701.

In the case of AND circuits, when the input signal of the control signal input part b70 is "0", even if the other terminals b73 and b72 of the input parts are "1" or "0", the outputs become "0", so a disconnect state is formed between the inputs and outputs.

When the input signal of the control signal input part b70 is "1", when the signals which are input to the other input terminals are "1", the outputs of the AND circuits become "1", while when the input signals of the other input terminals are "0", the outputs become "0", so a connect state is formed between the inputs and outputs.

In the case of NOR circuits, when the input of the control signal input part b70 is "0", when the input signals of the other terminals b72 of the input parts are "1", the outputs of the output terminals b75 become "0", while when the input signals of the other terminals b72 of the input parts are "0", the outputs of the output terminals b75 become "1" output and, while the phase shifts by 180 degrees, a connect state is formed. If the input signal of the control signal input part b70 becomes "1", even if the input signals of the input terminals b72 etc. change to "1" or "0", the output terminals b75 always become "0", so a disconnect state is formed.

Reference numeral 703 shows a temporary storage means. The temporary storage means 703 is formed by a RAM (random access memory) etc. and is provided with volatility. It stores data temporarily. If the power is turned off or if a reset signal is received, the stored content is erased. The temporary storage means 703 connects with the control means 711 and is erased in stored content by a reset signal from the control means 711. The content can be erased by outputting a reset signal to the reset terminal or by cutting the power of the temporary storage means 703.

Further, in the present embodiment, in the case of a terminal which is formed for a specific purpose such as for a mailer or for a browser, the central processing means 701 preferably can be booted up by a program which is stored in the temporary storage means 703. However, the present embodiment is not limited to this.

Reference numeral 704 shows a display means. As the display means 704, for example, a monitor display, various printers, a mobile phone screen, etc. may be illustrated. In the case of a smartphone or other such specification where the display means and touchpad are touched by the finger for input, sometimes it may be formed integrally with the input means 710.

Reference numeral 705 shows a data temporary storage means which is configured by a RAM which temporarily records data. The data temporary storage means 705 is preferably a RAM disk specification able to be recognized as a single drive. The data temporary storage means 705 is preferably used to record downloaded applications, mail, and attached files.

Note that, in the present embodiment, the data temporary storage means 705 is illustrated as an independent configuration for purposes of explanation, but when, in accordance with need, the temporary storage means 703 is provided with a storage area serving as the data temporary storage means 705, an independent one may be omitted.

Further, the data temporary storage means 705, in the same way as the temporary storage means 703, has a connect configuration wherein content is erased by a reset signal from the control means 711.

Reference numeral 706 shows a network connect means which is configured by a LAN connect connector, a front end circuit which modulates and demodulates a wireless LAN-use wireless radio wave, light, etc.

Reference numeral 707 shows a second disconnect/connect means. The second disconnect/connect means 707 is, for example, formed by the circuit which is shown in FIG. 6A and uses a signal from the control circuit 711 to repeatedly disconnect and connect components. In FIG. 6A, the second disconnect/connect means 707 is an array of a plurality of AND circuits and OR circuits which are arranged in at least numbers corresponding to the number of data buses.

Single ends of the input parts of the array of AND circuits 707a are connected to the control signal input part b76, while the other terminals b73 of the input parts are connected with the output terminal of the network connect means 706. The control signal input part b76 is connected with the control signal output part of the control means 711.

The output terminals b74 of the array of AND circuits 707a connect with the input port of the central processing means 701.

Single terminals of the input parts of the array of AND circuits 707b connect with the control signal input part b70, while the other terminals b72 of the input parts connect with the output port of the central control means 701. The output terminals b71 of the array of AND circuits 707b connect with the input part of the network connect means 706. The input terminals of the array of NOR circuits 707c similarly connect with the control signal input part b70, while the other terminals b72 of the input parts connect with the output part of the central processing means 701.

The output terminals b75 of the array of NOR circuits 707c connect with the input part of the test means 709.

The second disconnect/connect means 707 of FIG. 6A may also be formed by other logic circuits.

Reference numeral 708 shows a third disconnect/connect means. As the third disconnect/connect means 708, for example, the circuit configuration which is shown in FIG. 6C may be illustrated.

Figure 6C:
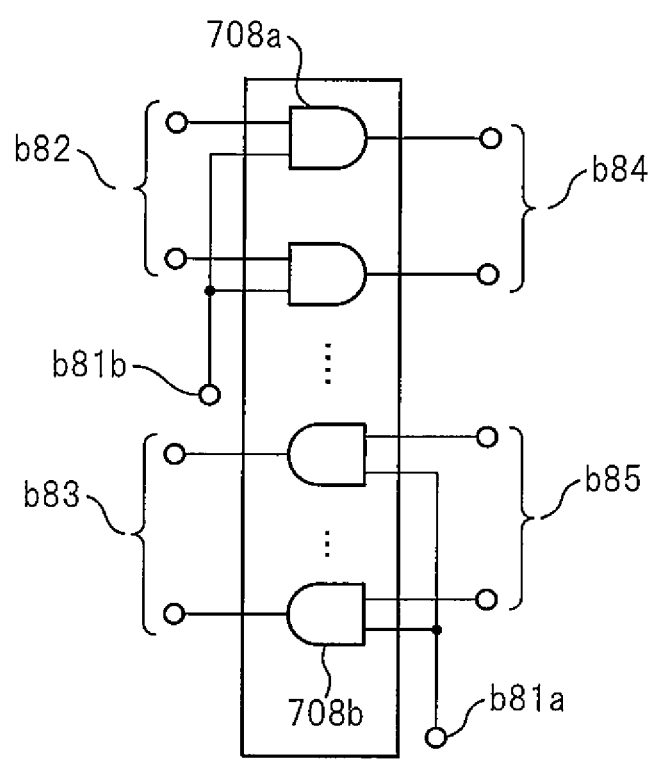
FIG. 6C is a view of the configuration which shows another circuit configuration of a disconnect/connect means which can be used in the present invention.

In the example of the circuit which is specifically shown in FIG. 6C, reference numeral 708a shows an array of a plurality of AND circuits. Reference numeral b82 shows other terminals of the input parts which connect with the output port of the central processing means 701. Reference numeral b84 shows the output terminals of the AND circuits 708a which connect with the input part of the data recording means 7012.

Reference numeral b81b shows a control input part which connects with a control output part of the control means b11.

Reference numeral 708b shows an array of a plurality of AND circuits. The other terminals b85 of the input parts connect with the data output part of the data recording means 7012. The output terminals b83 of the array of AND circuits 708b connect with the input port of the central processing means 701.

Reference numeral b81a shows a control input part which connects with the control signal output terminal of the control means 711.

For example, when the digital signal which is output from the control means 711 is "0", even if the signals from the other terminals b85 of the input parts of the array of AND circuits 708b changes, the outputs of the output terminals b83 become "0", so transmission of data is disconnected. The array of AND circuits 708a also disconnect and connect signals which are transmitted between the other terminals b82 of the input parts and the output terminals b84 by control digital signals "0" and "1" of the control input part b81b.

In FIG. 6C, the control means 711 outputs two different control signals, but sometimes it is enough that there be an array of AND circuits 708b which disconnect and connect data from the central processing means 701 to the data recording means 7012. Further, as shown in FIG. 6C, by providing disconnect/connect means at the input and output of the data recording means 7012, for example, the present embodiment can be suitably utilized even when the data recording means 7012 is a USB memory etc. which is provided from the outside and may contain a virus program inside it and the program and data in the portable media are checked.

For example, when providing an array of AND circuits 708b and disconnecting inflow of data of the data recording means 7012 to the central processing means 701 and using this for recording data, the array of AND circuits 708b are set to the connect state to copy data to the data temporary storage means 705, then the recording inside the data recording means 7012 is fully erased by formatting etc. The program in the data temporary storage means 705 is executed to check for a virus program, then rather than a virus program, a program or data which has to be archived is recorded again in the data recording means 7012. At that time, the control means 711 outputs a digital signal "1" instructing to set the array of AND circuits 708a in a connect state to the control input part b81b.

After the array of AND circuits 708a become the connect state, the program which requires archiving is recorded in the data recording means 7012. As shown in FIG. 6C, by providing two separate control input parts, sometimes it is possible to check programs in the USB etc. Note that, FIG. 6C shows use of other logic circuits to form this.

Reference numeral 709 shows a test means. The test means 709 receives as input a signal output signal from the central processing means 701 to the storage means 7021 at the time of disconnecting transmission of signals and a transmission signal from the central processing means 701 to the network connect means 706, detects the transmission of data caused by a virus program, and displays this by an LED etc. or outputs a signal which indicates the occurrence of a virus to the control means 711.

As the test means 709, for example, it is possible to use a means which detects the other party's IP address in the IP packet to confirm the presence of any virus or detects the timing of output of a packet to detect the presence of a virus.

The test means 709 may detect a virus, even without analyzing the content of output, by detecting a state of a packet being sent despite the situation being one in which there is usually no output. For example, sometimes it may also be a means which uses a shift register to convert data from a linear to a parallel format and furthermore connects a LED driver circuit and LED and visually observes the extent of flashing of the LED etc.

That is, the object of a virus program is to send information to an external server or to store a timed program or program which causes abnormal operation or to store a program for destroying the system in a hard disk or other recording means inside of a computer. When unilaterally connecting the infected computer to the outside and enabling remote operation from the outside or when sending passwords and other personal information to the outside, at the time of execution of a mailer or other specific application, data is sent unnaturally in a manner not usually seen. This is judged and detected by the frequency of output of the signals. This technique enables elimination of updating of virus tables etc. and protects against unknown viruses.

Reference numeral 710 shows an input means. The input means 710 is configured by a keyboard, mouse, touchpad, or other user interface. These are suitably selected for use in accordance with the size, application, and other factors of this embodiment.

Reference numeral 711 shows a control means. The control means 711, for example, outputs pulses for controlling the connect and disconnect operations of the disconnect/connect means or outputs a signal which resets storage of the temporary storage means.

The control means 711 may be configured by provision of a separate computer inside, but when the operations are determined to a certain extent or when operations are performed manually by a user, it may be configured by a combination of logic devices etc.

Further, the control means 711 sometimes connects with the central processing means 701, while the central processing means 701 receives input signals of the input means 710 when executing a downloaded program or attached file or program which is contained in advance in a USB memory or other external medium and outputs disconnect signals and connect signals to the respective disconnect/connect means.

Further, the control means 711 has a means for outputting an adjustable time signal to an operating system or application or program which is executed by the central processing means 701 so as to change the time data of the executed program. By the control means 711 outputting data which automatically changes the time data of the operating system, it becomes possible to detect a virus program such as a so-called Trojan horse which starts up at a predetermined time.

In accordance with need, the control means 711 may be provided with a switch for erasing a program etc., a switch for resetting the storage memory, or switches for disconnecting or connecting communication functions for sending and receiving data and therefore be configured to enable manual operation by a user.

Reference numeral 7012 shows a data storage means. The data recording means 7012 is a USB memory, SD memory, flash memory chip, or other medium which in some cases is used in a detachable state. The data recording means 7012 is a recording medium which records a downloaded program, attached file, or mail text which is found not to be a virus program.

Next, the operation of the embodiment which is shown in FIG. 6 and FIG. 7 will be explained.

The illustrated embodiment is, for example, configured for starting up a mailer program, browser software, or other program on a path at which a virus program may enter from the outside. One example of the operation at that time is shown.

If the present embodiment is started up in a state where the mail or application program has not been downloaded, the control means 711 outputs control signals so that the first disconnect/connect means 7022, second disconnect/connect means 707, and third disconnect/connect means 708 become the connect state. This output shows a default state, for example, a state where a "1" or "0" signal is continuously output.

For example, a "1" signal is continuously output to the control signal input part b70 in FIG. 6A which shows the first disconnect/connect means 7022.

The array of AND circuits 702a are all in a connect state. The digital signals which are input to the other terminals B221 of the input parts are sent as they are to the output terminals b222.

The storage means 7021 copies the operating system, mailer, etc. through the first disconnect/connect means 7022 to the temporary storage means 703, then the central processing means 701 starts up based on the storage content of this temporary storage means 703. By adopting a RAM startup system, at the time of execution, even if a virus program has infected the temporary storage means 703, a control signal from the control means 711 can be used to easily erase the data and the operating system etc. can be again copied from the storage means 7021 to the temporary storage means 703 to restore the original state. Note that, when preventing just outflow of information etc., sometimes it is also possible to not use a temporary storage means 703, but start up by the storage means 7021 through the first disconnect/connect means 7022.

The display means 704 displays the operating system. The target software is selected by operating an input means 710. This being so, a browser display of download of a program appears. The user operates the input part 710 to receive the application program.

The central processing means 701, for example, downloads an application program from an external web server through the network connect means 706. The downloaded application program is stored in the data temporary storage means 705 through the network connect means 706, second disconnect/connect means 707, and central processing means 701.

The program which is stored in the data temporary storage means 705 is freely executed by an action of input by the input means 710. The central processing means 701 includes a not shown buffer memory. Sometimes a general configuration may be adopted in which programs are copied and executed individually and temporarily.

When starting to execute a download program, attached file of mail, etc., the control means 711 outputs disconnect signals to the respective disconnect/connect means.

Note that, when executing HTML mail or such, the external server sends data, so the control means 711 outputs the digital signal "1" to the control input part b76 of the AND circuit array 707a which is shown in FIG. EA to form a connect state between the other terminals b73 and the output terminals b74 of the input parts.

The control means 711, for example, preferably automatically operates linked with the data which is output from the input means 710.

Due to this disconnect, when a virus is included, the connection with the medium to be infected is broken, so the data cannot be recorded. Further, data cannot be sent to the outside. Therefore, even if a virus program is executed, there is no effect on the surroundings.

The test means 709 monitors the operation of this program being executed and confirms that data is not being sent to unwarranted parties etc.

Further, it visually or otherwise confirms if the content corresponds to be objective in the execute state.

This is because virus mail and downloaded virus programs just disguise their titles etc. and can be judged whether necessary or unnecessary by just executing or opening them.

The present invention can display the programs and data and judge any where there is a clear disguised or unclear relationship between the title and content etc. to be a virus program for deletion and enables a virus test without requiring a table etc. containing a list of viruses.

The test means 709 detects and displays the state of reception of a protocol signal which enables connection with a network which is known to not be necessary from the content of a program etc. when a program, attached file, mailer, etc. which is downloaded after disconnect is executed, so can recognize to a certain extent that the virus program is in an execute state, so deletes the program etc. which the central processing means 701 is executing.

Next, it calls up the received mail or program from the data temporary storage means 705 and executes it by a central control means 701.

When the program or mail finishes being processed, the recording part of the temporary storage means 703 is reset once. Note that, when further desiring to download mail in the middle of this, it is assumed that the central processing means 701 will not execute the application program etc. and a signal is output which ends the disconnect of the second disconnect/connect means 707 and sets the connect state.

When there is an abnormality in the output of the test means 709, the control means 711 shows the abnormality by an LED display etc. Based on this display or when recognizing that the content of the program is off from the target, the user pushes a switch on the control means 711 to erase that program.

After erasing a virus program in a state not infected by it, the central processing means 701 records the program of the data storage means in the data recording means 7012, but the control means 711 switches the third disconnect/connect means 708 from the disconnect state to the connect state. This switching may sometimes also be performed manually by the user. Further, the timing of switching is preferably the state when the program is closed and copied from the data temporary recording means 705 to the data recording means 7012.

When infected by a virus program, it is preferable to delete the program and operating system which were being executed in the RAM and on the CPU and copy the operating system and mailer which were stored in the storage means 7021 to the central processing means 701 in the state with the viewing program started up.

Note that, the content of the recorded data of the data recording means 7012 may also sometimes be fully erased by the control means 711. The control means 711 can display a downloaded program, attached file, HTML mail, and, furthermore, a program which was recorded on a USB or other portable media without regard as to the presence of a virus and can simply erase it as well.

[Eighth Embodiment]

Next, referring to FIG. 8, an eighth embodiment of the present invention will be explained.

Figure 8:
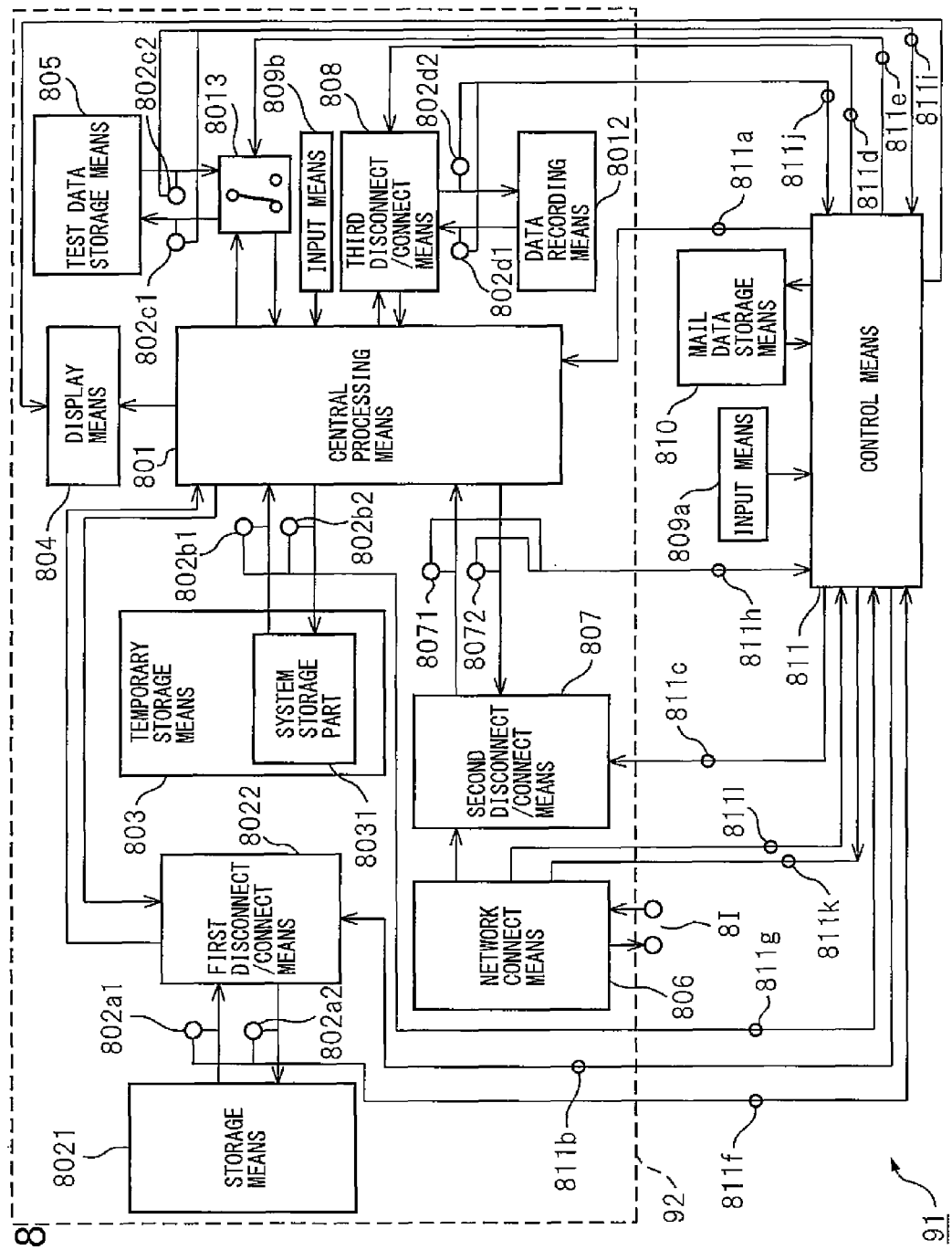
FIG. 8 is a block diagram which shows an eighth embodiment of the present invention.

The embodiment of FIG. 8 is comprised of a combination of an execute part 92 which executes a virus program or other test program in an isolated fashion and a control part 91 which controls this configuration based on a behavior signal.

In the execute part 92, reference numeral 801 shows a central processing means. The central processing means 801 is comprised of a CPU, MPU, or other means which executes an operating system and programs, displays operations on a monitor, and moves, deletes, or otherwise processes data.

Reference numerals 802a, 802b, 802c, and 802d shows parts which output behavior. These parts can convert movement of data into optical, electromagnetic wave, infrared ray, and other physical signals for output. Further, it is possible to display a write operation or read operation with respect to the RAM, ROM, hard disk, or USB memory.

The behavior output is output of a physical signal which accompanies movement of data explained above. An LED or sound etc. may be used for output or a photocoupler or other converter may be arranged and the signal again replaced by an electrical signal for use as an external control signal in some cases. Furthermore, another physical signal may be converted to in accordance with the objective of the signal processing.

Reference numeral 8071 shows a received output display part. The received output display part 8071 displays the behavior when data is moved from the network connect means 806 to the central processing means 801. Reference numeral 8072 shows a sent output display part. The sent output display part 8072 outputs the behavior when data is moved from the central processing means 801 to the network connect means 806 direction. Data is moved at the time of this transmission and reception by conversion of the data to light, an electromagnetic wave, infrared ray, or other physical signal.

Reference numeral 802a1 shows a first read output part which displays movement of data when reading data from the storage means 8021. At the first read output part 802a1, if, for example, a storage IC chip, the signals which are output from the RE (read enable) terminal and the CS (chip select) or CE (chip enable) terminals are used to make an LED light up or are converted by a photocoupler by electrophoto→photoelectric conversion to convert them to electrical signals.

The second read output part 802b1, third read output part 802c1, and fourth read output part 802d1 are also configured and operate in the same way as the first read output part 802a1. However, the second read output part 802b1 and second write output part 802b2 are connected to the system storage part 8031 which corresponds to the area of the temporary storage means 803 in which the operating system is written.

The system storage part 8031 may be made a RAM of part of a so-called RAM board or may be configured separate from the RAM in which data is read and written.

Reference numeral 802a2 shows a first write output part. The first write output part 802a2 can use as a read signal a write signal when writing data in the storage means 8021 comprised of the signal of a WE (write enable) terminal of a storage IC chip or a mixed signal of a read signal and write signal which are output from a CS (chip select) terminal and from which the read signal is logically subtracted.

The second write output part 802b2, third write output part 802c2, and fourth write output part 802d2 are also configured and operate in the same way as the first write output part 802a2.

Reference numeral 8021 shows a storage means in which an operating system and applications are stored. For example, a portable application, KNOPPIX®, ANDROID®, WINDOWS PE®, WINDOWS CE®, or other small size operating systems, and other ordinary operating systems and applications are stored.

Reference numeral 8022 shows a first disconnect/connect means which operates to turn on/off a signal for movement of data between the storage means 8021 and the central processing means 801 by a control signal which is transmitted from the control means 811 through an electrical lead line 811b.

Reference numeral 803 shows a temporary storage means which is comprised of a RAM memory or other means for temporary storage. For example, it may be an IC chip in which the content is erased when the power is cut off. The temporary storage means 803 preferably is used with the operating system copied in the system storage part 8031 for starting up the operating system.

Reference numeral 804 shows a display means. The display means 804 is a display part which displays data when a program is executed, displays a menu, etc. For example, a liquid crystal monitor may be illustrated. The display means 804 preferably is connected to both the central processing means 801 and the control means 811 to enable display. For example, preferably a single screen is used to display different means in a plurality of windows, but in some cases two or more monitors may be used.

The above display may form a GUI (graphical user interface) by combination with input means 809a and 809b and may also be a touchpad configuration.

The display means 804 may connect with both the central processing means 801 and the control means 811 and may display these simultaneously or at different timings.

Reference numeral 805 shows a test data storage means. The test data storage means 805 is for temporarily recording mail data, attached file data, or other test data (including program data etc.) and is configured by a RAM, flash memory, EEPROM, etc., but a RAM is preferable to eradicate an infected state caused by a virus program.

Reference numeral 806 shows a network connect means and forms a wired LAN or wireless LAN specification. The network connect means 806 connects with an input/output terminal 81 which connects with the Internet, an Extranet, or other external network.

The network connect means 806 and the control means 811 are connected through an electrical lead line 811k as the receiving side and are connected through an electrical lead line 8111 as the sending side. Note that, this example is the case relating to a full duplex system. In the case of a semiduplex system, sometimes a single line is enough.

Reference numeral 807 shows a second disconnect/connect means. The second disconnect/connect means 807 is for disconnecting or connecting movement of data between the network connect means 806 and the central processing means 801. It connects the control means 811 and electrical lead line 811e and drives the on/off operation by a control signal of the control means 811.

Reference numeral 8012 shows a data recording means. The data recording means 8012 is, for example, configured by a USB memory, SD card, or other medium or other memory which enables continuous storage and, preferably, is configured to be detachable.

The data recording means 8012 is, for example, a medium in which data which is required for a test is recorded and includes a USB socket or other media connector.

Reference numeral 808 shows a third disconnect/connect means. The third disconnect/connect means 808 disconnects or connects movement of data between the central processing means 801 and the data recording means 8012 and drives an on/off operation by a control signal which is transmitted from the control means 811 through the electrical lead line 811*d*.

Reference numeral 809*a* shows an input means. The input means 809*a* is comprised of a keyboard, mouse, touch panel, etc. and connects with the control means 811. The input means 809*a*, as explained above, may be integrally formed with the display means 804.

Reference numeral 809*b* shows an input means. The input means 809*b* connects with the central processing means 801 for input of operation instructions and data. The input means 809*b* may be formed by a keyboard, mouse, etc., but preferably it is made the same as the input means 809*a*.

Reference numeral 810 shows a mail data storage means. The mail data storage means 810 is configured by a RAM, flash memory, EEPROM, or other storage device which temporarily or continuously records mail data and attachment data from a mail server through the Internet.

The data which is stored in the mail data storage means 810 is at least preferably stored in a state unable to be executed on a computer. A state where it is encrypted, compressed, or otherwise converted or changed is preferable.

When data is read from the mail data storage means 810 and moved to the test data storage means 805, the protected data is preferably stripped of protection. For the protection, to shorten the processing time, a Vernam cipher type or other stream cipher is preferably used.

Reference numeral 8013 shows a switching means. The switching means 8013 is formed by a multiplexer, switch, etc. and switches between connection of the central processing means 801 and the test data storage means 805 and connection of the test data storage means 805 and the mail data storage means 810 by a control signal from the control means 811.

Reference numeral 811 indicates the control means. The control means 811 is preferably configured by a computer which is equipped with a hard disk or other continuous storage device and is provided with a mouse or other input means 809*a* which the user operates.

The control means 811 forms connect states with the behavior information display parts by the electrical lead lines and, furthermore, forms connect states with the switching and on/off control parts of the first disconnect/connect means 8022, second disconnect/connect means 807, and switching means 8013 through the electrical lead lines.

The output signals of the first read output part 802*a*1 and first write output part 802*a*2 are input through a plurality of electrical lead lines 811*f* to the control means 811 by connection, the output signals of the receive display output part 8071 and send display output part 8072 are input through a plurality of electrical lead lines 811*h* to the control means 811 by connection, the output signals of the second read output part 802*b*1 and second write output part 802*b*2 are input through a plurality of electrical lead lines 811*g* to the control means 811 by connection, the output signals of the third read output part 802*c*1 and third write output part 802*c*2 are input through a plurality of electrical lead lines 811*i* to the control means 811 by connection, the output signals of the fourth read output part 802*d*1 and fourth write part 802*d*2 are input through a plurality of electrical lead lines 811*j* to the control means 811 by connection, the control means 811 and the switching means 8013 are connected through the electrical lead line 811*e* so that the output signal of the control means 811 causes a switching operation of the switching means 8013 and are connected through the electrical lead line 811*b* so that the control signal of the control means 811 drives the first disconnect/connect means 8022 on/off, and the control signal of the control means 811 drives the second disconnect/connect means 807 on/off by connection through the electrical lead line 811*c*.

The control means 811 and the central processing means 801 are connected through a plurality of electrical lead lines 811*a*. Through these, signals to start and start operation and reset operation are output from the control means 811 to the central processing means 801. Signals are transmitted on only one direction.

The electrical lead lines are not necessarily wire shaped. They may also be formed by electrical circuits which are formed on a board by patterning. Further, the electrical lead lines from which the control means 811 outputs control signals may be connected with photocouplers or other electrically separated means. The photocoupler need only be one of an extent which holds information of a single bit signal or multi bit signal where the objective of the signal is indicating on/off operation. Even if data with a large amount of information is input, a mode of transmission in which a filter operation is performed to reduce the amount of information is preferable.

The startup switch is preferably formed so that the execute part 92 and the control part 91 are simultaneously started up, but they may also be separately started up.

Next, the embodiment which is shown in FIG. 8 will be explained.

At the time of startup, the first disconnect/connect means 8022 is in the connect state, the second disconnect/connect means 807 is in the disconnect state, the third disconnect/connect means 808 is in the disconnect state, and the switching means 8013 is in a state which connects the central processing means 801 and the test data storage means 805 (default).

When the power switch is turned on, the execute part 92 and the control part 91 start operating.

The central processing means 801 opens and stores the operating system and applications which were stored in the storage means 8021 in the system storage part 8031 of the temporary storage means to set an execute state. At that time, the first read output part 802*a*1 outputs movement of data by behavior information (for example, flashing of an LED). When that behavior information ends, the control means 811 outputs a signal which turns the first disconnect/connect means 8022 off.

The off signal which is transmitted from this control means 811 through the electrical lead line 811*b* sets the first disconnect/connect means 8022 in the disconnect (off) state.

The central processing means 801 is in a state where it can process data.

The control means 811 connects with the mail server on the Internet through the network connect means 806, downloads all of the mail on the mail server, and stores them in the mail data storage means 810. The operation of the control means 811 may be realized by an input operation of user on the input means 809*a* or may be performed automatically.

At that time, the mail on the mail server (not shown) is preferably erased, but it is also possible for it not to be erased, then leave it to be utilized as data for picking up virus infected mail data.

The control means 811 outputs a switching signal to the switching means 8013 so as to move one piece of the mail data which is stored in the mail data storage means 810 to the test data storage means 805. After switching is finished, the mail data is moved to the test data storage means 805.

The mail data is moved one piece at a time by three patterns of mail text, an attached file, and image data which is attached to mail text.

After one piece of mail data is moved to the test data storage means 805, that is, after the third read output part 802c1 finishes flashing, the control means 811 outputs a signal which switches the switching means 8013 to connect the central processing means 801 and the test data storage means 805.

If the central processing means 801 confirms that there is mail data in the test data storage means 805, it executes this mail data. It is executed linked with NOTEPAD® or another text display program if the type of data is for example text data and with FIREFOX® or other browser software if HTML.

This execute program is started up as the initial execution program at the time of startup of the execute part after the operating system etc. is copied into the system storage part 8031 of the temporary storage means 803.

The control means 811 receives the behavior of the second read output part 802b1, second write output part 802b2, third read output part 802c1, third write output part 802c2, fourth read output part 802d1, and fourth write output part 802d2 or this behavior converted to an electrical signal as input while monitoring the movement, erasure, and rewrite of the data.

In such behavior states, for example, when there is a write operation in the system storage part 8031 inside the temporary storage means 803 regardless of the operation being only for display of mail, the control means 811 receives a signal which indicates the possibility of virus infection through the signal line 811g and outputs a reset signal through the electrical lead line 811a. The reset signal causes the central processing means 801 to perform a reset operation or causes the possibility of virus infection to be displayed at the display means 804, forms a state inquiring about the intent of the user, then enables a user to perform an operation for starting up a reset operation.

For this reason, the data of the temporary storage means 803 and the test data storage means 805 is erased, so a virus program is naturally eliminated.

The first disconnect/connect signal 8022 uses both the output of the reset signal and the signal from the control means 811 to connect the storage means 8021 and the central processing means 801. The operating system and applications of the storage means 8021 are stored in the system storage part 8031 inside the temporary storage means 803 to form the boot state.

While not shown, the central processing means 801 is connected to a ROM (read only memory) which records a BIOS program. This BIOS program is used as the basis for startup.

Due to the reset signal, the central processing means 801 enters the reset state, erases the content of the test data storage means 805, and returns to the initial state.

The control means 811 may judge whether the execute part 92 has returned to the initial state after a predetermined time or when outputting a disconnect signal to the first disconnect/connect means 8022.

If there is no abnormal behavior in the different behavior output means after execution of the mail, after a predetermined time, the control means 811 sends a signal to the switching means 8013 to connect the mail data storage means 810 and the test data storage means 805, returns the mail data of the test data storage means 805 again, and adds a code indicating it is normal in state.

Note that, for a predetermined time, the central processing means 801 may change the built-in clock and confirm if the program of the virus is not in the execute state.

In this way, in the mail data storage means 810, normal mail data remains together with an indication that it is normal.

The display means 804 displays the content when data which is stored in the test data storage means 805 is executed to thereby enable normal mail to be visually read. Further, based on the behavior information, before the reset signal is output, the mail or attached file which corresponds to the behavior information may be displayed and a message which indicates the possibility of virus infection may be displayed.

When the mail which is stored in the mail data storage means 810 moves to the test data storage means, it is possible to erase the data while leaving just the normal data. Further, in some cases, it is possible not to erase the data of the mail data storage means 810 and form a state accompanied with a display differentiating normal and virus infection data.

After the mail finishes being tested in the mail data storage means 810, the control means 811 may move the inside mail data to another storage area and perform ordinary mail processing.

The configuration which is shown in FIG. 8 detects write output and read output which show behavior information and performs control based on these without input of an electrical signal from the execute part 92. By configuration in this way, it is possible to detect and erase an unknown virus program without being affected by a signal which is formed by the virus program which is operating at the execute part.

Next, the operation of the execute part 92 in the case of HTML mail in mail data will be explained.

The control means 811 judges an identifier of the data when moving mail data to the test data storage means 805 and when it is the HTML format, sets the second disconnect/connect means 807 to the connect state.

When the test data storage means 805 connects with the central processing means 801 through the switching means 8013 and the central processing means 801 executes the HTML data of the test data storage means 805, the send display output part 8072 and the receive display output part 8071 output by display the behavior which shows movement of data.

During this time, behavior where a write operation is performed regardless of being a timing where no write operation is performed is monitored in the display of output of the second read output part 802b1, third read output part 802c1, second write output part 802b2, and third write output part 802c2.

When there is such a write operation, the control means 811 uses this display output data as the basis to output a reset signal through the electrical lead line 811a and erase the data of the temporary storage means 803 and test data storage means 805.

The above explanation of operation is an explanation of operation of mail data, but also an operation for testing for virus infection of a USB memory will be explained.

A data recording means 8012 which is comprised of a USB memory is attached. At this time, the central processing means 801 is in a state where it does not start up with insertion such as with an auto run function or the third disconnect/connect means 808 is in the off state. The third disconnect/connect means 808 is preferably normally in the disconnect state and is started by input of a user at the input means 809*a* of the control means 811.

Due to the input from the input means 809*a*, the control means 811 sets the third disconnect/connect means 808 at the connect state. The USB data test program which is recorded at the temporary storage means 803 becomes the execute state.

A list of the USB data in the data recording means 8012 is displayed on the display means 804.

Data is selected from the input means 809*b* or fully automated execution is selected.

One piece of data of the data in the data recording means 8012 is moved to the test data storage means 805.

The control means 811 sets the third disconnect/connect means 808 to the disconnect state by the behavior of 802*e*1 and the behavior of the fourth read output part 802*d*1.

The data which is stored in the test data storage means 805 is executed by the central processing means 801. The content is output to and displayed at the display means 804.

After the content is displayed and a predetermined time elapses when there is no abnormality in the behavior of the third write output part 802*c*2, fourth read output part 802*d*1, and second read output part 802*b*1, the control means 811 controls the third disconnect/connect means 808 to the connect state and adds data of the test results to this data to overwrite data or write data.

This operation, based on the operation of the central processing means 801, reads the next data from the data recording means 8012 and stores it in the test data storage means 805. At this time, the control means 811 outputs a signal which controls the third disconnect/connect means 808 to the disconnect state by the behaviors of the 802*e*1 and fourth read output part 802*d*1.

The data which is stored in the test data storage means 805 is executed. At that time, if there is an abnormality in the behavior of the third read output part 802*c*1, the second write output part 802*b*2 to which the data is sent and which displays the behavior, or the fourth read output part 802*d*1, the control means 811 outputs a reset signal to the central processing means 801. At that time, the control means 811 may display a message showing an abnormality on the display means 804 and output a reset signal after waiting for input of the user through the input means 809*a* resulting from that display.

The central processing means 801 is reset upon receiving this reset signal. Further, the control means 811 sets the first disconnect/connect means 8022 to the connect state.

The central processing means 801 boots the operating system and other programs which are stored in the storage means 8021 and launches and stores the operating system etc. in the system storage part 8031 of the temporary storage means 803.

Due to this reset operation, the infected operating system and program are erased. The control means 811 breaks the connection of the first disconnect/connect means 8022 when the behavior state of the first read output part 802*a*1 and third write output part 802*c*2 after reset ends.

The data of the data recording means 8012 is stored as is in the state with no test log or erased.

In the present embodiment as well, the mail-related data which is obtained from the network connect means 806 is converted once by a protecting means (encoding, code conversion, or other reproducible converting means) to be stored in the mail data storage means 810. It is reproduced by a decoding/converting means at the point of time of being input to the test data storage means 805.

Regarding the execution of a malicious program, a "malicious program" usually indicates a program which steals personal information or passwords or maliciously rewrites or destroys data, but a malicious program also can be said to adopt behavior which is similar to a virus program. At that time, when the behavior which is shown by the state of light emission of the transmission output display part 8072 of FIG. 8 or the light emission state of the memory in which the mail address is stored is frequent in a predetermined period from executing the program, it is also possible to display a message that the possibility of the program being malicious is large on the display means or display a message of erasure and execute a reset.

Further, when executing and displaying data of the test data storage means 805 and storing data which might be infected by a virus, and requiring reset, when recording data in the data recording means 8012, it is also possible to convert the code to render the data unexecutable in state.

INDUSTRIAL APPLICABILITY

As explained above, according to the present invention, without having to worry about infection by a spear type clearly targeted virus program, inflow of virus data due to download of a program download, or infection by a virus program which is contained in a USB memory or other existing media or other virus, stable mail communication, Internet connection, and data viewing are possible, virus detection is possible, and a drop in server functions due to access attacks can be prevented, so great utilization becomes possible in BtoB (Business to Business), BtoC (Business to Consumer), and other e-commerce, e-government, inhouse procedures using mail, and other various fields using currently utilized mail.

The invention claimed is:

1. An electronic security device for preventing malicious software comprising:
an input device for inputting external data;
a processor for executing said external data controlled by a read-only program stored in a storage device;
a disconnect control device for connecting and disconnecting data communication between said processor and a computer network;
a sensor device for remotely detecting a time and an amount of data contained in an electrical signal related to a behavior of said external data recognizable at an area external to the security device, corresponding to a state of data communication in an execution location of an executable program executed by said processor, wherein said behavior is detected as a variation, over time, of electrical signals obtained by separating into separate signal lines one or both of an enable electrical signal and a selection electrical signal at one or both of an input terminal and an output terminal of said processor, converting the separated one or both of enable and selection electrical signals to corresponding signal information consisting of an optical signal, and reconverting said signal information by photoelectric conversion to corresponding electrical signals to detect the output time and the amount of data contained in said electrical signal;

a judging device for judging whether said external data is infected with a malicious software or not, based on a difference in the time and the amount of data contained in said electrical signal between the behavior detected by said sensor device and an expected behavior of said executable program executed by said processor, wherein the disconnect control device disconnects data communication between said processor and said computer network when said external data is judged by said judging device as infected with said malicious software; and an erasing device for erasing said executable program executed in said processor, when said external data is judged by said judging device as infected with said malicious software, wherein said disconnect control device reconnects data communication between said processor and said computer network, when said executable program is erased.

2. The electronic security device according to claim 1 further comprising a display device for displaying said external data executed by said processor.

3. The electronic security device according to claim 1 wherein said external data is a program, mail-related data, a download application, or existing data of a recording medium.

4. The electronic security device according to claim 1 wherein said disconnect control device disconnects and connects data transfer between a device which digitally stores data and a central processing which processes digital data.

5. The electronic security device according to claim 1 wherein said judging device outputs a warning signal when the external data is judged as infected with a malicious software.

6. The electronic security device according to claim 1 wherein said malicious software is one or more selected from the group consisting of a computer virus program, a worm program, a Trojan Horse program, a program which causes execute error or computer hang up.

7. The electronic security device according to claim 1 wherein the program in said erasing device is erased through resetting or restarting of a computer.

8. An electronic security device for preventing malicious software comprising:
an input device for inputting external data;
a program storage device which stores one or more of an operating system program, mailer program, browser program, application program, and viewer program, wherein said program storage device includes a temporary storage device in which the program stored in said program storage device is temporarily stored;
a processor for executing said external data with a computer processor which starts up based on stored data of said temporary storage device;
a disconnect control device which disconnects and connects data communication between said processor and a computer network, and disconnects and connects data communication between said program storage device and said temporary storage device;
a sensor device for remotely detecting a time and amount of an amount of data contained in an electrical signal related to a behavior of said external data recognizable at an area external to the security device, corresponding to a state of data communication in an execution location of an executable program executed by said processor, wherein said behavior is detected as a variation, over time, of electrical signals obtained by separating into separate signal lines one or both of an enable electrical signal and a selection electrical signal at one or both of an input terminal and an output terminal of said processor, converting the separated one or both of enable and selection electrical signals to corresponding signal information consisting of an optical signal, and reconverting said signal information by photoelectric conversion to corresponding electrical signals to detect the time and the amount of data contained in said electrical signal, and wherein the disconnect control device disconnects data communication between said processor and said computer network when said external data is judged by said judging device as infected with said malicious software;

a judging device for judging whether said external data is infected with a malicious software or not, based on a difference in the time and the amount of data contained in said electrical signal between the behavior detected by said sensor device and an expected behavior of said executable program executed by said processor; and an erasing device for erasing said executable program executed in said processor and rebooting said processor, when said external data is judged by said judging device as infected with said malicious software, wherein said disconnect control device reconnects data communication between said processor and said computer network, when said executable program is erased.

9. The electronic security device according to claim 8 further comprising a display device for displaying said external data executed by said processor.

10. The electronic security device according to claim 8 wherein said external data is a program, mail-related data, a download application, or existing data of a recording medium.

11. The electronic security device according to claim 8 wherein said disconnect control device disconnects and connects data transfer between a device which digitally stores data and a central processing which processes digital data.

12. The electronic security device according to claim 8 wherein said judging device outputs a warning signal when the external data is judged as infected with a malicious software.

13. The electronic security device according to claim 8 wherein said malicious software is one or more selected from the group consisting of a computer virus program, a worm program, a Trojan Horse program, a program which causes execute error or computer hang up.

14. The electronic security device according to claim 8 wherein the program in said erasing device is erased through resetting or restarting of a computer.

* * * * *